(12) United States Patent
Yoshida et al.

(10) Patent No.: US 9,942,174 B2
(45) Date of Patent: Apr. 10, 2018

(54) BUS CONTROL DEVICE, RELAY DEVICE, AND BUS SYSTEM

(71) Applicant: Panasonic Intellectual Property Management Co., Ltd., Osaka (JP)

(72) Inventors: Atsushi Yoshida, Osaka (JP); Tomoki Ishii, Kyoto (JP); Satoru Tokutsu, Saitama (JP); Takao Yamaguchi, Osaka (JP); Yuuki Soga, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 198 days.

(21) Appl. No.: 14/641,197

(22) Filed: Mar. 6, 2015

(65) Prior Publication Data

US 2015/0180805 A1 Jun. 25, 2015

Related U.S. Application Data

(63) Continuation of application No. PCT/JP2014/001367, filed on Mar. 11, 2014.

(30) Foreign Application Priority Data

Mar. 13, 2013 (JP) ................................. 2013-050945

(51) Int. Cl.
*H04L 12/861* (2013.01)
*H04L 12/801* (2013.01)
(Continued)

(52) U.S. Cl.
CPC ...... *H04L 49/9057* (2013.01); *G06F 13/1626* (2013.01); *G06F 13/1673* (2013.01);
(Continued)

(58) Field of Classification Search
None
See application file for complete search history.

(56) References Cited

U.S. PATENT DOCUMENTS 5,889,969 A 3/1999 Getzlaff et al.
6,272,600 B1 8/2001 Talbot et al.
(Continued)

FOREIGN PATENT DOCUMENTS

JP 09-121212 A 5/1997
JP H10-228417 A 8/1998
(Continued)

OTHER PUBLICATIONS

International Search Report for corresponding International Application No. PCT/JP2014/001367 dated May 27, 2014.

*Primary Examiner* — Anh-Vu Ly
*Assistant Examiner* — Hector Reyes Ortiz
(74) *Attorney, Agent, or Firm* — Renner, Otto, Boisselle & Sklar, LLP

(57) ABSTRACT

A bus control device (401a) includes a storage (408) that stores a transmission order of data pieces transmitted from a first node (402) to each second node (403); a sorter (413) that receives data pieces transferred from each second node toward the first node and refers to a predefined sorting rule to determine a sorting destination of each data piece; a buffer (409) that stores the sorted data pieces while classifying the sorted data pieces by the second node as a transmission source; and a connection controller (410) that refers to change permission/rejection information indicating whether or not an order is permitted to be changed while the data piece is transferred from each second node to the first node, and transmits data pieces, the order of which is not changed, from the buffer to the first node in the same order as the transmission order stored on the storage.

3 Claims, 23 Drawing Sheets

(51) Int. Cl.
*H04L 12/933* (2013.01)
*G06F 13/16* (2006.01)
*G06F 21/85* (2013.01)

(52) U.S. Cl.
CPC .............. *G06F 21/85* (2013.01); *H04L 47/34* (2013.01); *H04L 49/102* (2013.01); *G06F 2221/2141* (2013.01)

(56) References Cited

U.S. PATENT DOCUMENTS

| | | | |
|---|---|---|---|
| 6,314,087 B1 * | 11/2001 | Oh | H04L 12/5693 370/252 |
| 6,976,135 B1 | 12/2005 | Talbot et al. | |
| 7,937,540 B2 * | 5/2011 | Sonoda | G06F 21/6209 711/154 |
| 8,880,819 B2 * | 11/2014 | Walker | G06F 13/1626 711/158 |
| 9,432,298 B1 * | 8/2016 | Smith | H04L 49/9057 |
| 2012/0057467 A1 | 3/2012 | Yoshida et al. | |
| 2012/0079150 A1 | 3/2012 | Aoki et al. | |

FOREIGN PATENT DOCUMENTS

| | | |
|---|---|---|
| JP | 3086261 B2 | 7/2000 |
| JP | 2010-177942 A | 8/2010 |
| JP | 2012-073851 A | 4/2012 |

\* cited by examiner

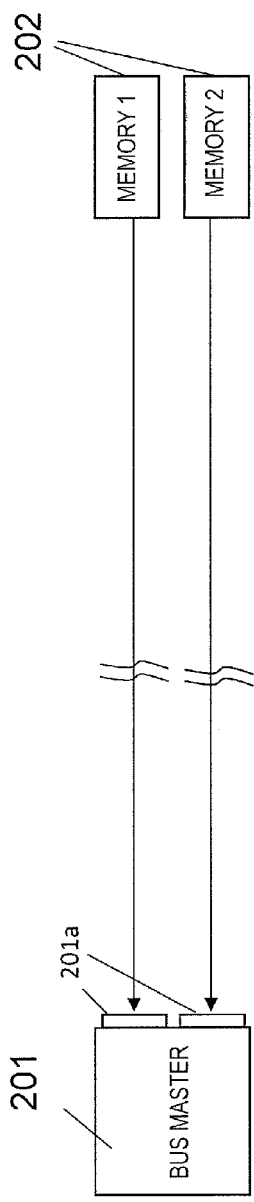
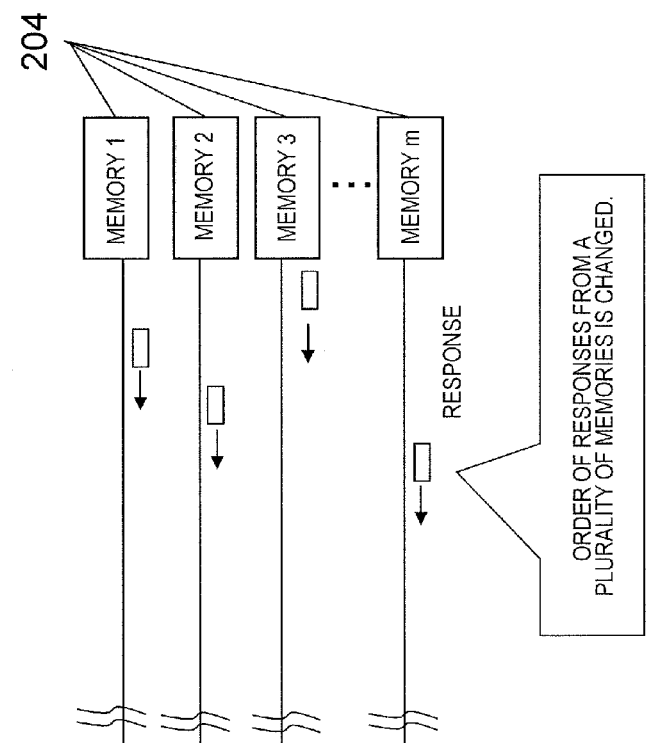
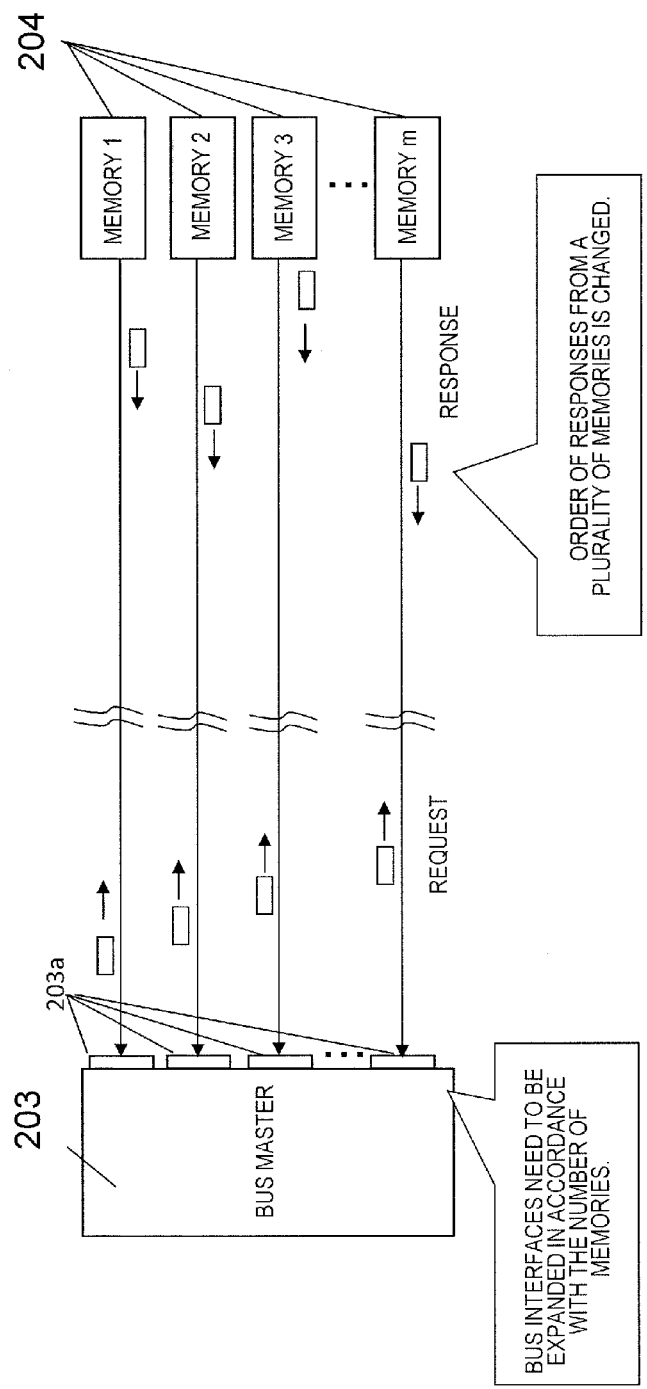

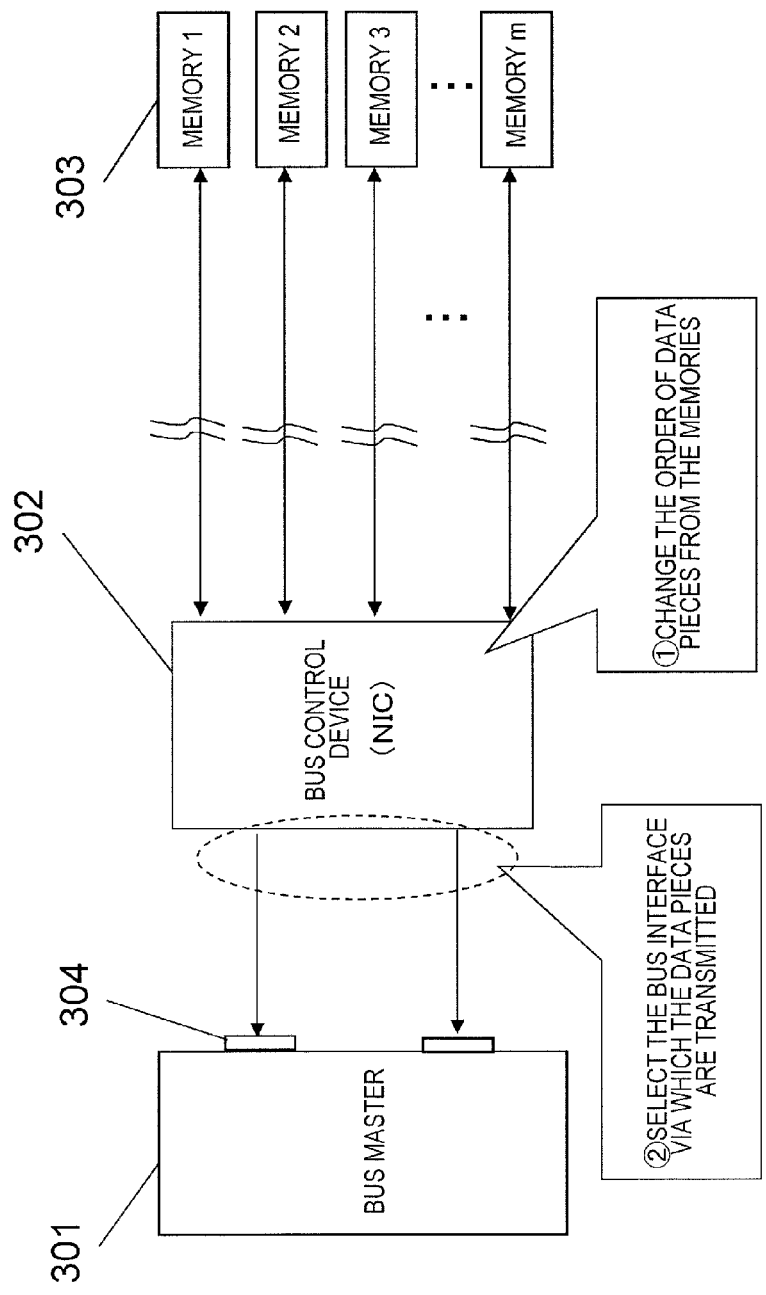

FIG.6

| TRANSACTION ID | CHANGE OF ORDER |
|---|---|
| 0 | REJECTED |
| 1 | PERMITTED |
| 2 | PERMITTED |
| ⋮ | ⋮ |
| N | REJECTED |

FIG.7

| MEMORY ID | CHANGE OF ORDER | FORM OF USE |
|---|---|---|
| 0 | PERMITTED | USED INDEPENDENTLY |
| 1, 3 | REJECTED | USED IN COMBINATION |
| 2, 4 | REJECTED | USED IN COMBINATION |
| ⋮ | ⋮ | |
| m | REJECTED | USED INDEPENDENTLY |

FIG.8

|   | DATA ID | TRANSACTION ID |
|---|---------|----------------|
| 1 | 001     | 0              |
| 2 | 010     | 1              |
| 3 | 011     | 2              |
|   | ⋮       | ⋮              |
| M | 110     | 1              |

FIG.9

| TRANSACTION ID | BUS INTERFACE |
|----------------|---------------|
| 0              | 0             |
| 1              | 1             |
| 2              | 1             |
| ...            | ⋮             |
| N              | 0             |

| MEMORY ID | PARTIAL BUFFER FOR STORAGE |
|---|---|
| 1 | 1ST BUFFER<br>2ND BUFFER |
| 2 | 3RD BUFFER |
| 3 | 3RD BUFFER |
| ⋮ | ⋮ |
| m | n'TH BUFFER |

FIG.16A

| CHANGE OF ORDER | MEMORY ID | PARTIAL BUFFER FOR STORAGE |
|---|---|---|
| PERMITTED | 1 | 1ST BUFFER |
| REJECTED | 3 | 2ND BUFFER |
| | 5 | 3RD BUFFER |
| | ... | ... |
| | m | nTH BUFFER |

FIG.16B

| TRANSMISSION ROUTE | MEMORY AS DESTINATION | PARTIAL BUFFER FOR STORAGE |
|---|---|---|
| ROUTE 1 | 1 | 1ST BUFFER |
| ROUTE 2 | 2 | 2ND BUFFER |
| | 5 | 3RD BUFFER |
| | ... | ... |
| | m | nTH BUFFER |

| TRANSACTION ID | DATA ID |
|---|---|
| 1 | 001 |
| 2 | 001 |
| 3 | 002 |
| N | 1 |

FIG.23A

| MEMORY ID | BUS MASTER ID | PARTIAL BUFFER FOR STORAGE |
|---|---|---|
| 1 | 001 | 1ST BUFFER |
| 1 | 010 | 2ND BUFFER |
| 1 | 011 | 3RD BUFFER |
| ... | ... | ... |
| m | 001 | nTH BUFFER |

FIG.23B

| CHANGE OF ORDER | MEMORY ID | BUS MASTER ID | PARTIAL BUFFER FOR STORAGE |
|---|---|---|---|
| PERMITTED | — | — | 1ST BUFFER |
| REJECTED | 3 | 010 | 2ND BUFFER |
| | 5 | 011 | 3RD BUFFER |
| | ... | ... | ... |
| | m | 001 | nTH BUFFER |

BUS CONTROL DEVICE, RELAY DEVICE, AND BUS SYSTEM

This is a continuation of International Application No. PCT/JP2014/001367, with an international filing date of Mar. 11, 2014, which claims priority of Japanese Patent Application No. 2013-050945, filed on Mar. 13, 2013, the contents of which are hereby incorporated by reference.

BACKGROUND

1. Technical Field

The present application relates to a technology for controlling the order of responses to be transmitted from a plurality of slaves to a bus master in response to requests transmitted from the bus master to the plurality of slaves in a semiconductor integrated circuit including a network of semiconductor buses.

2. Description of the Related Art

For efficient development of integrated circuits made in order to realize an intended function or performance, it is attempted to reuse and connect existing bus masters. In this type of development, it is required that various types of bus masters that are different in the bus width, the bus protocol and the required quality should be easily connectable to each other.

Such various types of bus masters are different in the number of slaves to be accessed, the number of bus interfaces, and the size of the receiving buffer. Therefore, for connecting various types of bus masters, bus interfaces need to be designed so as to provide transmission performance required of each bus master.

Japanese Patent No. 3086261 discloses a technology for improving the transmission performance between a bus master and a plurality of slaves. The technology in Japanese Patent No. 3086261 physically increases the number of bus interfaces of the bus master, so that a logical bus including a plurality of physical buses can be used to expand the transmission band of access to a memory.

SUMMARY

For efficient development of an integrated circuit, it is desired to decrease the number of development steps to a minimum possible value.

A non-limiting illustrative embodiment according to the present application provides a bus control device capable of offering required performance while decreasing the number of development steps to a minimum possible value.

In one general aspect, a bus control device is provided in a bus system in which a first node, a plurality of second nodes and a plurality of relay devices are connected by a packet-exchange-system bus configured on an integrated circuit. The bus control device is provided on a transmission path for data pieces to be transmitted and received between the first node and each of the plurality of second nodes. The bus control device includes an order storage that stores a transmission order of data pieces transmitted from the first node to each of the second nodes; a sorter that receives data pieces transferred from each of the second nodes toward the first node and refers to a predefined sorting rule to determine a sorting destination of each of the data pieces; a buffer that stores the sorted data pieces in the state where the sorted data pieces are classified by the second node as a transmission source of each of the data pieces; and a connection controller that refers to change permission/rejection information indicating whether or not an order of the data pieces is permitted to be changed while the data pieces are transferred from each of the second nodes to the first node, and transmits data pieces, the order of which is not permitted to be changed, from the buffer to the first node in the same order as the transmission order stored on the order storage.

The above-described general and specific embodiment may be implemented by use of a system, a method and a computer program, or may be realized by use of a combination of a system, a method and a computer program.

According to the above aspect of a bus control device, when data pieces are received from a plurality memories, it is unnecessary to create bus interfaces individually for each bus master, and responses from a plurality of slaves can be received by merely changing the settings on the bus control device. This can simplify the design of the semiconductor integrated circuit.

In addition, it is not necessary to physically increase the bus interfaces on the bus master side for the plurality of slaves. This can decrease the mounting surface area and the power consumption of the bus master.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 1A shows a structure of bus interfaces 201*a* of a bus master 201 and a bus; and FIG. 1B shows a structure of bus interfaces 203*a* of a bus master 203 and a bus.

FIG. 2 shows an overview of a structure provided to solve the problem of the conventional technology recognized by the present inventors.

FIG. 6 shows an example of change permission/rejection information stored on a change permission/rejection information storage 407.

FIG. 7 shows another example of change permission/rejection information stored on the change permission/rejection information storage 407.

FIG. 8 shows an example of order information stored on an order storage 408.

FIG. 9 shows an example of IF information stored on an IF information storage 411.

FIGS. 16A and 16B each show an example of sorting rule stored on the sorting rule storage 412.

FIGS. 23A and 23B each show an example of sorting rule stored on a sorting rule storage 412 in a relay device 1601.

DETAILED DESCRIPTION

Figure 3:
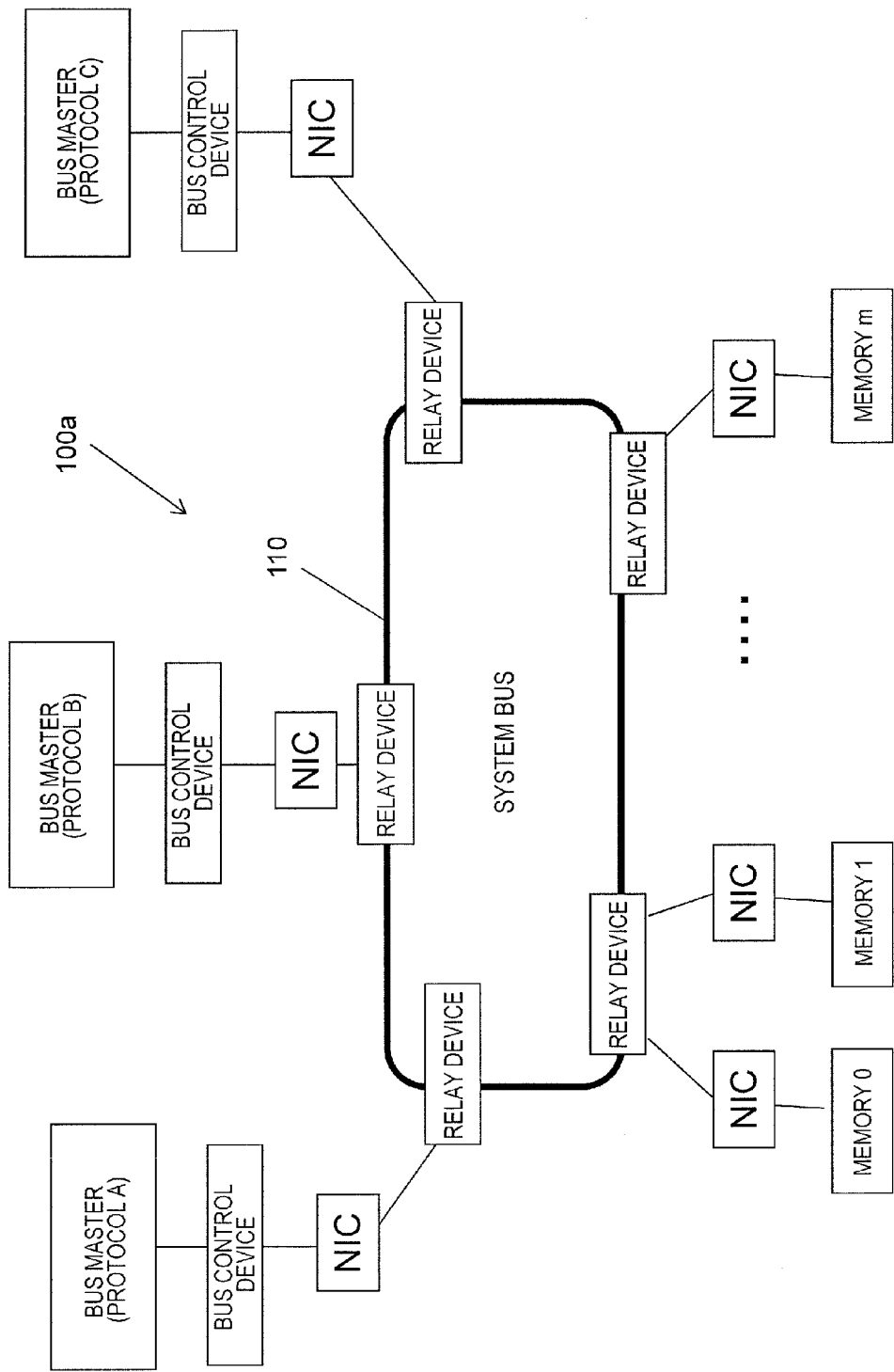
FIG. 3 shows an example of structure of a bus system 100*a* configured on a semiconductor integrated circuit according to this disclosure.

As described above, the technology in Japanese Patent No. 3086261 increases the number of bus interfaces in accordance with the required performance to expand the transmission band. However, the technology in Japanese Patent No. 3086261 requires the bus interfaces to be created individually in accordance with the performance required of the bus master, which increases the number of development.

When a bus master accesses a plurality of memories via different bus interfaces, the order in which data pieces are transmitted in return from the memories is changed because of the difference in the distance from the bus master to each memory and in the processing time in each memory. Therefore, in the case where data pieces returned from the memories need to be processed in the order in which the bus master has transmitted data pieces to the memories, the bus master needs to change the order of the received data pieces. This requires the bus master to have an additional function, which also increases the number of steps of development.

Now, with reference to FIG. 1, the problem found by the present inventors will be described more specifically.

As a method for improving the transmission performance between a bus master and a plurality of slaves, the technology in Japanese Patent No. 3086261 physically increases the number of bus interfaces of the bus master, so that a logical bus including a plurality of physical buses is used. Japanese Patent No. 3086261 describes that this structure can expand the transmission band of access to a memory.

FIG. 1A shows a structure of bus interfaces 201a of a bus master 201 and buses by which the bus master 201 accesses two memories 202. FIG. 1B shows a structure of bus interfaces 203a of a bus master 203 and buses by which the bus master 203 accesses m-number of memories 204. The bus interfaces are, for example, input/output terminals at which the bus master transmits and receives data.

As shown in FIG. 1A, in order to allow data transmission/receiving between the bus master and each of the memories by the technology in Japanese Patent No. 3086261, the bus interfaces need to be expanded for each bus master. In addition, the number of the bus interfaces increases in accordance with the number of the memories. This increases the number of steps of expansion.

As shown in FIG. 1B, when a bus master accesses a plurality of memories via physically different buses, the order of data pieces transmitted from the memories is changed because of the difference in the distance from the bus master to each memory and in the processing time in each memory. Therefore, in the case where the data pieces returned from the memories need to be processed in the order in which the bus master has transmitted data pieces to the memories, the bus master needs to change the order of the data pieces received from the memories. This need of changing the order of the data pieces also increases the number of steps of expansion.

FIG. 2 shows an overall structure provided to solve the problem of the conventional technology recognized by the present inventors.

In this disclosure, a bus control device 302 is provided between a bus master 301 and a plurality of memories 303. The bus control device 302 is different from, or integrated with, a network interface controller (NIC). The bus control device 302 once stores data pieces to be transmitted from the plurality of memories 303 to the bus master 301 in the state where the data pieces are classified by the memory. The bus control device 302 then transmits the data pieces to each of bus interfaces 304 of the bus master 301 in the same order as the order in which data pieces (requests) have been transmitted from the bus master to the memories. Namely, the provision of the bus control device 302 allows the data pieces to be transferred to each bus interface 304 in the state where the order of the data pieces transmitted from the memories 303 is maintained. This does not require any change to be made in the bus master or the bus interfaces 304, and therefore does not require the bus master 301 to be expanded.

Thus, the bus control device 302 has a function of changing the order of the data pieces from the plurality of memories 303 to the bus master 301 such that the order of the responses from the plurality of memories 303 is the same as the order of the data pieces transmitted from the bus master 301 to the memories 303, and also a function of determining which of the bus interfaces 304 of the bus master 301 is to be used to transmit the data pieces from each memory 303 to the bus master 301. Preparing a bus control device having such functions and incorporating the bus control device into a system bus makes it unnecessary to expand various types of existing bus masters. Thus, an integrated circuit effectively using the existing resources can be provided.

As described above, the bus control device 302 changes the order of the data pieces transmitted from the plurality of memories 303 for each of the bus interfaces of the bus master 301. As a result, the expansion of the bus interfaces of the bus master 301, which would otherwise be needed by a change of the specifications or the like, is made unnecessary. Such a change of the specifications or the like can be dealt with by merely changing the setting of the bus control device 302. This simplifies the development and decreases the number of steps.

An overview of an embodiment according to the present invention is as follows.

A bus control device in an embodiment according to the present invention is provided in a bus system in which a first node, a plurality of second nodes and a plurality of relay devices are connected by a packet-exchange-system bus configured on an integrated circuit. The bus control device is provided on a transmission path for data pieces to be transmitted and received between the first node and each of the plurality of second nodes. The bus control device includes an order storage that stores a transmission order of data pieces transmitted from the first node to each of the second nodes; a sorter that receives data pieces transferred from each of the second nodes toward the first node and refers to a predefined sorting rule to determine a sorting destination of each of the data pieces; a buffer that stores the sorted data pieces in the state where the sorted data pieces are classified by the second node as a transmission source of each of the data pieces; and a connection controller that refers to change permission/rejection information indicating whether or not an order of the data pieces is permitted to be changed while the data pieces are transferred from each of the second nodes to the first node, and transmits data pieces, the order of which is not permitted to be changed, from the buffer to the first node in the same order as the transmission order stored on the order storage.

For example, in the case where the change permission/rejection information indicates that the order of none of the data pieces is permitted to be changed, the change permission/rejection information is not referred to, and all the data pieces are transmitted from the buffer to the first node in the same order as the transmission order stored on the order storage.

For example, the first node includes a plurality of bus interfaces; and the connection controller refers, for each of the data pieces, to interface information specifying a bus interface as a transmission destination of the data piece to transmit the data piece from the buffer to the bus interface.

For example, the interface information specifies, for each of the data pieces, the bus interface as the transmission destination of the data piece in accordance with at least one of an application to be executed by the integrated circuit and a type of a second node, among the plurality of second nodes, corresponding to the data piece.

For example, the change permission/rejection information is determined based on at least one of an application to be executed by the integrated circuit and a type of a second node, among the plurality of second nodes, corresponding to the data piece.

For example, the sorter refers to a predefined sorting rule to classify the data pieces further based on whether or not the order of the data pieces is permitted to be changed, so as to determine the sorting destination of each of the data pieces; and the buffer stores the sorted data pieces in the state where the data pieces are classified further based on whether or not the order of the data pieces is permitted to be changed.

For example, the sorter refers to a predefined sorting rule to classify the data pieces further by a transfer route thereof, so as to determine the sorting destination of each of the data pieces; and the buffer stores the sorted data pieces in the state where the data pieces are classified further by the transfer route.

For example, the sorter changes a method of classifying the data pieces to determine the sorting destination, in the buffer, of each of the data pieces in accordance with a size of each of the data pieces.

For example, each of the first node and the second nodes is either one of a bus master, a memory and an input/output device.

A relay device in another embodiment according to the present invention is provided in a bus system in which a first node and a plurality of second nodes are connected by a packet-exchange-system bus configured on an integrated circuit. The relay device relays data pieces to be transmitted and received between the first node and each of the plurality of second nodes. The relay device includes a relay buffer that stores data pieces received from the bus; a relay controller that transmits the data pieces stored on the relay buffer to either one of the plurality of second nodes; an order storage that stores a transmission order of the data pieces transmitted to each of the second nodes; a sorter that receives data pieces transferred from each of the second nodes toward the first node and refers to a predefined sorting rule to determine a sorting destination of each of the data pieces; a buffer that stores the sorted data pieces in the state where the sorted data pieces are classified by the second node as a transmission source of each of the data pieces; a connection controller that refers to change permission/rejection information indicating whether or not an order of the data pieces is permitted to be changed while the data pieces are transferred from each of the second nodes to the first node, and performs control such that data pieces, the order of which is not permitted to be changed, are transmitted from the buffer to the first node in the same order as the transmission order stored on the order storage; and a transmission controller controlled by the connection controller to output the data pieces to the bus.

For example, the sorter refers to a predefined sorting rule to classify the data pieces by the first node and the second node to determine the sorting destination of each of the data pieces; and the buffer stores the sorted data pieces in the state where the data pieces are classified by the second node as the transmission source of each of the data pieces and also by the first node.

For example, the change permission/rejection information is determined based on at least one of an application to be executed by the integrated circuit and a type of a second node, among the plurality of second nodes, corresponding to the data piece.

For example, the sorter refers to a predefined sorting rule to classify the data pieces further based on whether or not the order of the data pieces is permitted to be changed, so as to determine the sorting destination of each of the data pieces; and the buffer stores the sorted data pieces in the state where the data pieces are classified further based on whether or not the order of the data pieces is permitted to be changed.

For example, the sorter refers to a predefined sorting rule to classify the data pieces further by a transfer route thereof, so as to determine the sorting destination of each of the data pieces; and the buffer stores the sorted data pieces in the state where the data pieces are classified further by the transfer route.

For example, the sorter refers to a predefined sorting rule to select either a method of determining the sorting destination of each of the data pieces by the second node or a method of determining the sorting destination of each of the data pieces by both of the second node and the first node.

For example, the sorter changes a method of classifying the data pieces to determine the sorting destination, in the buffer, of each of the data pieces in accordance with a size of each of the data pieces.

For example, each of the first node and the second nodes is either one of a bus master, a memory and an input/output device.

A bus system in still another embodiment according to the present invention includes a packet-exchange-system bus configured on an integrated circuit. The bus system includes a first node; a plurality of second nodes; a plurality of relay devices including a first relay device and a second relay device; a first bus control device provided on a transmission path for data pieces to be transmitted and received between the first node and the first relay device; and a second bus control device provided on a transmission path for data pieces to be transmitted and received between the plurality of second nodes and the second relay device. At least one of the plurality relay devices, the first bus control device, and the second bus control device includes a relay buffer that stores data pieces received from the bus; a relay controller that transmits the data pieces stored on the relay buffer to either one of the plurality of second nodes; an order storage that stores a transmission order of the data pieces transmitted to each of the second nodes; a sorter that receives data pieces transferred from each of the second nodes toward the first node and refers to a predefined sorting rule to determine a sorting destination of each of the data pieces; a buffer that stores the sorted data pieces in the state where the sorted data pieces are classified by the second node as a transmission source of each of the data pieces; a connection controller that refers to change permission/rejection information indicating whether or not an order of the data pieces is permitted to be changed while the data pieces are transferred from each of the second nodes to the first node, and performs control such that data pieces, the order of which is not permitted to be changed, are transmitted from the buffer to the first node in the same order as the transmission order stored on the order storage; and a transmission controller controlled by the connection controller to output the data pieces to the bus.

For example, the plurality of relay devices further comprise an inter-bus relay device that connects a local bus and a system bus to each other; the local bus includes the first control device and the first relay device; the system bus includes the second relay device; the connection controller included in the at least one of the devices performs control such that the data pieces are transmitted from the buffer to the first node in the same order as the transmission order stored on the order storage.

For example, the bus system further includes a third relay device; a plurality of third nodes; and a third bus control device provided on a transmission path for data pieces to be transmitted and received between the plurality of third nodes and the third relay device. In the at least one of the devices, the relay control device transmits the data pieces stored on the relay buffer also to either one of the plurality of third nodes; the order storage also stores a transmission order of the data pieces transmitted to each of the third nodes; the sorter receives data pieces transferred from each of the second nodes and each of the third nodes toward the first node and refers to a predefined sorting rule to determine the sorting destination of each of the data pieces; the buffer stores the sorted data pieces in the state where the sorted data pieces are classified by the second node and the third node as transmission sources of the data pieces; and the connection controller refers to change permission/rejection information indicating whether or not an order of the data pieces is permitted to be changed while the data pieces are transferred from each of the second nodes and each of the third nodes to the first node, and performs control such that data pieces, the order of which is not permitted to be changed, are transmitted from the buffer to the first node in the same order as the transmission order stored on the order storage.

For example, the third bus control device includes a relay buffer that stores data pieces received from the bus; a relay control device that transmits the data pieces stored on the relay buffer to either one of the plurality of third nodes; an order storage that stores a transmission order of the data pieces transmitted to each of the third nodes; a sorter that receives data pieces transferred from each of the third nodes toward the first node and refers to a predefined sorting rule to determine the sorting destination of each of the data pieces; a buffer that stores the sorted data pieces in the state where the sorted data pieces are classified by the third node as a transmission source of each of the data pieces; a connection controller refers to change permission/rejection information indicating whether or not an order of the data pieces is permitted to be changed while the data pieces are transferred from each of the third nodes to the first node, and performs control such that data pieces, the order of which is not permitted to be changed, are transmitted from the buffer to the first node in the same order as the transmission order stored on the order storage; and a transmission controller controlled by the connection controller to output the data pieces to the bus. In the third bus controller, the connection controller performs control such that the data pieces are transmitted from the buffer to the first node in the same order as the transmission order stored on the order storage.

Hereinafter, a semiconductor integrated circuit according to this disclosure will be first described before the description of embodiments of this disclosure.

Figure 4:
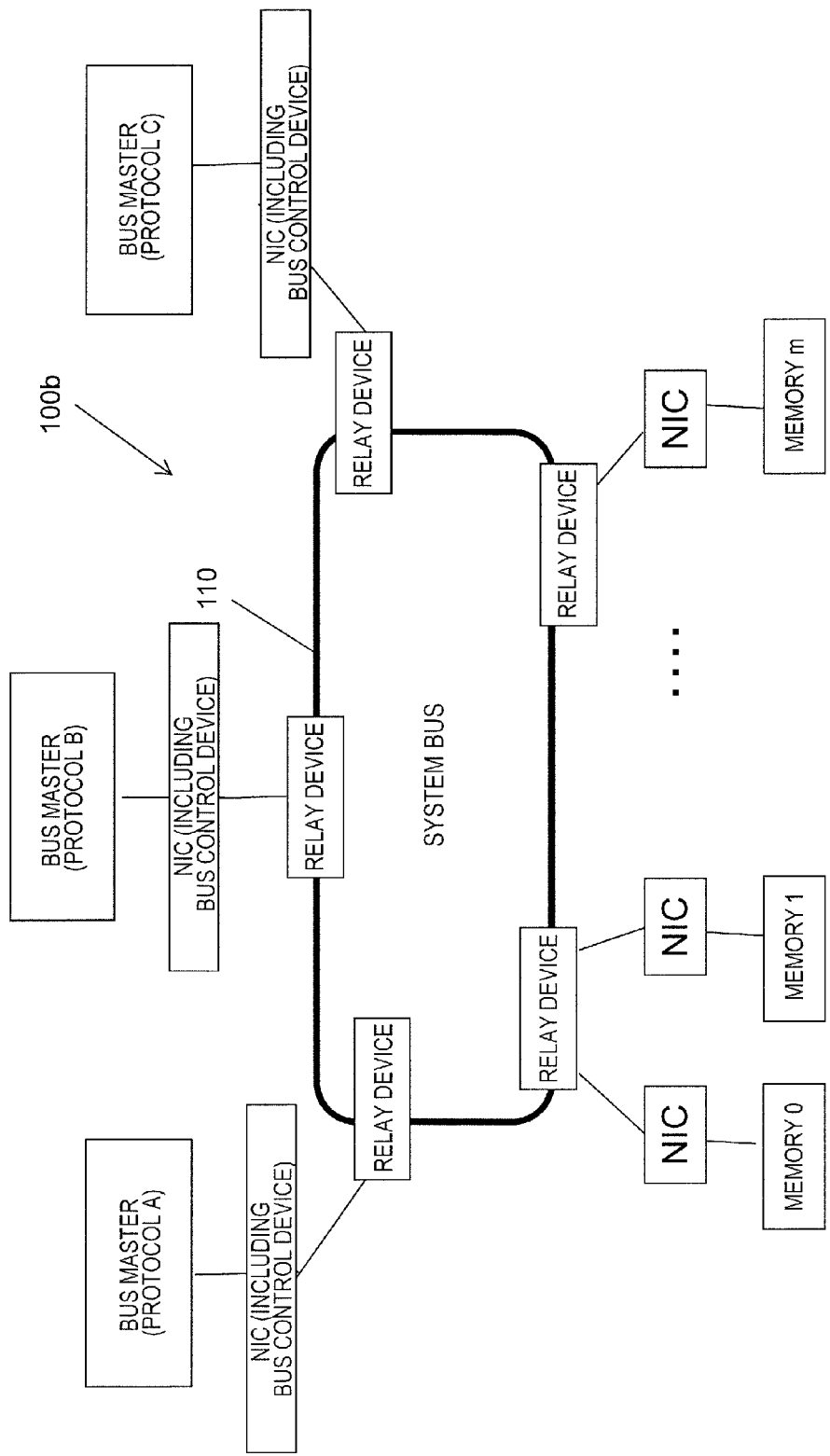
FIG. 4 shows an example of structure of a bus system 100*b* configured on a semiconductor integrated circuit according to this disclosure.

FIG. 3 shows an example of structure of a bus system 100a configured on a semiconductor integrated circuit according to this disclosure. The bus system 100a is connected to a plurality of bus masters and a plurality of memories. The plurality of bus masters are different in the bit width of input/output access and the communication protocol. In FIG. 3, the bus interfaces are omitted for the sake of simplicity. In FIG. 4 referred to later also, the bus interfaces are omitted for the sake of simplicity.

Each bus master is connected to a system bus 110 via the above-described bus control device and a network interface controller (hereinafter, may be referred to as an "NIC"). The "NIC" is a circuit that performs packetization of converting data pieces into a packet in order to transmit the data pieces transmitted by the bus master to a relay device and also performs depacketization of extracting the data pieces from the packet received from the relay device. For performing depacketization, the NIC also converts the bus protocol for transmitting the data pieces to the bus master.

The example of structure of the bus control device shown in FIG. 3 will be described later with reference to FIG. 5.

FIG. 4 shows an example of structure of a bus system 100b configured on a semiconductor integrated circuit according to this disclosure. In this example, the bus control devices are incorporated into NICs. The example of structure of the bus control device shown in FIG. 4 will be described later with reference to FIG. 15.

Referring to FIG. 3 and FIG. 4, data pieces transferred on the system bus 110 is relayed by at least one relay device provided on the system bus 110. The "relay device" is a circuit that transfers packetized data pieces to a node which is the destination. Thus, each bus master is connected to a plurality of memories via the bus control device, the NIC and the system bus 110 having a network structure, and can transmit and receive data pieces.

Structures different from those shown in FIG. 3 and FIG. 4 are conceivable. For example, the above-described bus control device may be incorporated into one relay device or any one of a plurality of relay devices that connect a local bus and the system bus to each other. The "local bus" is a bus that connects the system bus to a bus master that is physically close to the system bus in a part of the area on the semiconductor integrated circuit. The local bus has a bus width different from that of the system bus, and operates at an operating frequency also different from that of the system bus. An example of structure of the local bus will be described later with reference to FIG. 22.

FIG. 3 and FIG. 4 each show an example of structure of the system bus 110 that connects the relay devices in a ring shape. This is merely an example, and the semiconductor integrated circuit is not limited to having a structure in which the relay devices are connected in a ring shape. For example, a mesh-type structure in which the relay devices are connected in a lattice, a hierarchical structure in which the relay devices are connected in multiple steps, or any other structure may be adopted. FIG. 3 and FIG. 4 each show an example in which the plurality of bus masters are connected to a plurality of common memories. The bus masters are not limited to being connected to common memories. For example, the bus masters may be connected to an input/output device I/O for an external circuit (not shown).

FIG. 3 and FIG. 4 respectively show semiconductor integrated circuits 110a and 110b each including the system bus 100 having a network structure. Such a structure in which a plurality of bus masters are connected by a bus having a network structure is referred to as a "network on chip (NoC)". The semiconductor integrated circuit may have a structure in which the bus masters and the memories are directly connected to each other.

Figure 5:
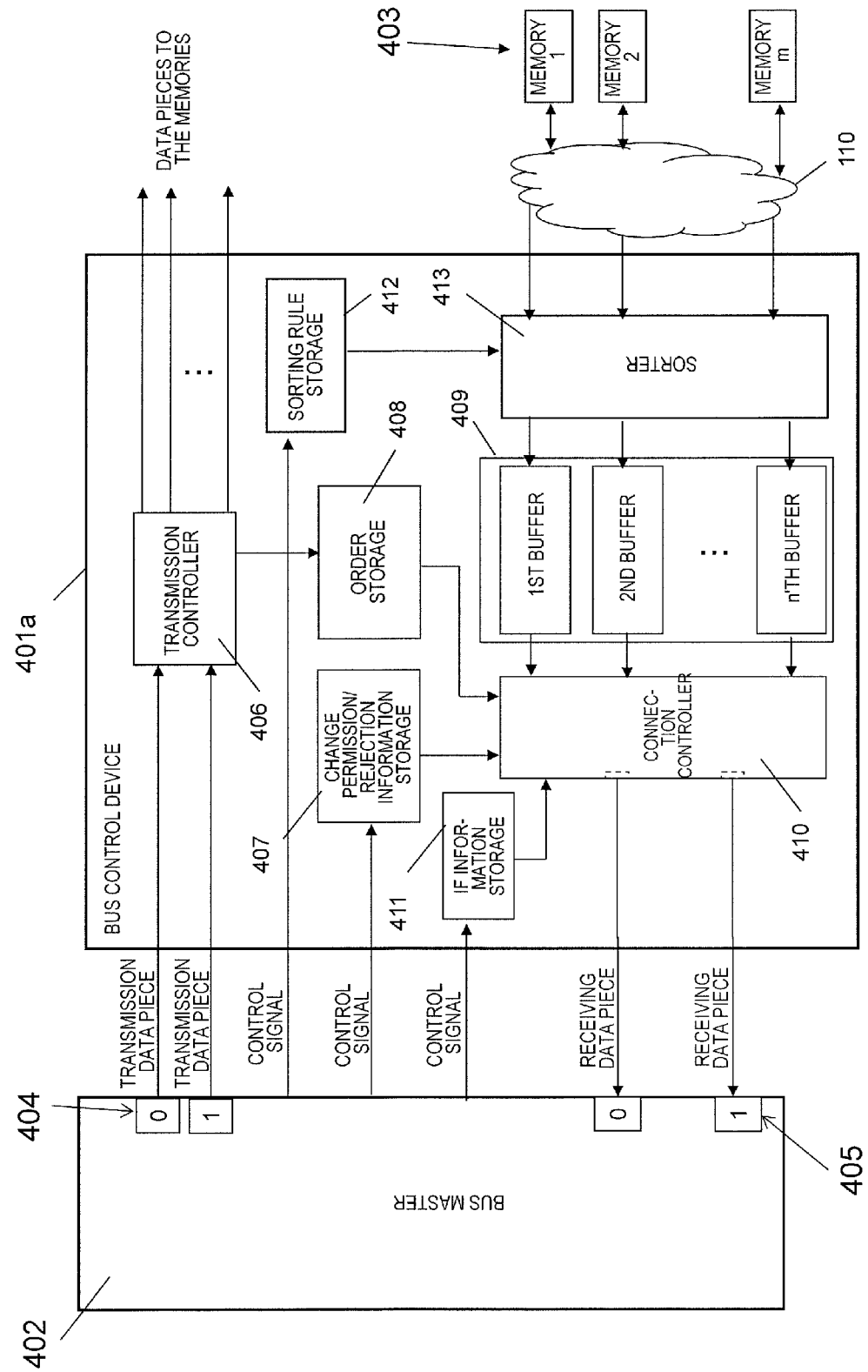
FIG. 5 shows a basic structure of a bus control device 401*a* according to this disclosure.

FIG. 5 shows a basic structure of a bus control device 401a according to this disclosure. The bus control device 401a corresponds to the bus control device shown in FIG. 3. In FIG. 5, functions required for a packet exchange system (packetization and depacketization) are omitted for the sake of simplicity. In the bus system 100b configured on the semiconductor integrated circuit shown in FIG. 4, each NIC has a structure that realizes packetization and depacketization required for the packet exchange system in addition to the bus control device. The structure of the NIC will be described later with reference to FIG. 15. The system bus 110a in FIG. 3 transmits and receives data pieces by the packet exchange system. Nonetheless, the structure shown in FIG. 5 is usable for the case where the packet exchange system is not used and data pieces are transmitted and received by a line exchange system.

The bus control device 401a connects a first node that transmits/receives data pieces and a plurality of second nodes that receive/transmit the data pieces. As each of the first node and the second nodes, a bus master, a memory, an input/output device I/O or the like is usable. In FIG. 5, the bus control device 401a is connected to a bus master 402 and also transmits data pieces to, and receives data pieces from, a plurality of memories on the system bus 110.

In the following description of this embodiment, the bus master 402 is the first node, and memories 403 are the second nodes. In the following description, the "transmission of a data piece" is performed by the bus master 402 accessing a specified address of a memory 403 and reading data to, or writing from, the address once.

The bus master 402 is connected to the bus control device 401a via a transmission bus interface 404 and a receiving bus interface 405.

The bus control device 401a includes a transmission controller 406, a change permission/rejection information storage 407, an order storage device 408, a buffer 409 prepared for each of the memories, a connection controller 410, an IF information storage 411, a sorting rule storage 412, and a sorter 413.

The transmission bus interface 404 is a circuit that controls transmission of data pieces and commands from the bus master 402 to the bus control device 401a. The receiving bus interface 405 is a circuit that controls receiving of data pieces and commands by the bus master 402 from the bus control device 401a.

The transmission controller 406 is a circuit that transmits data pieces from the bus master 402 to the memories 403.

The change permission/rejection information storage 407 is a storage device (e.g., SRAM) that stores change permission/rejection information. When the bus master transmits a data assembly (transaction) regarding a series of processes, the "change permission/rejection information" shows whether or not the bus master is permitted to change the order of the data pieces included in the transaction on the transmission path.

The "change of the order of data pieces on the transmission path" refers to that the order of commands issued from a bus master to a memory or an input/output device I/O is different from the order of response data pieces transmitted from the memory or the input/output device I/O to the bus master.

Such a change of the order occurs when the bus master transmits data pieces to, and receives data pieces from, a plurality of memories or a plurality of input/output devices I/O. A specific example of such a case is regarding a bus master involved in reproduction of a moving picture on which delay is strictly restricted. When a required transmission band is not provided merely by transmission to, and receiving from a single memory, access is made to a plurality of memories in parallel at the same time. In this manner, the insufficiency of the transmission band is solved and a low-delay transfer is realized.

Another example is regarding a graphics engine that draws CG (Computer Graphics). When a required transmission band is not provided merely by a single memory, the load of the process is distributed to a plurality of memories. In this manner, a high level of performance is provided.

Even with one same bus master, the transmission band may become insufficient with a single memory and a plurality of memories and accesses become necessary when a different application or use case (e.g., resolution, image quality or the like of reproduction of a moving picture or CG) is used.

As can be seen, the change permission/rejection information may be provided for each type of bus master or for each type of application to be executed by the integrated circuit or for each type of use case.

The order storage 408 is a storage device (e.g., SRAM) that stores information on the transmission order of the data pieces transmitted from the bus master 402 to the memories 403.

The buffer 409 is a storage device (e.g., SRAM) that stores the data pieces transmitted from the memories 403 in the state where the data pieces are classified by the memory, which is the transmission source. The buffer 409 includes a plurality of partial buffers. FIG. 5 shows first through n'th buffers as the partial buffers. The buffer 409 may be divided into a plurality of partial buffers physically or logically as long as the data pieces are stored as being classified by the memory 403. Hereinafter, the term "buffer 409" will be used collectively unless a specific partial buffer needs to be explicitly specified.

The IF information storage 411 is a memory that stores information on the bus interfaces used to transmit data pieces to the bus master 402 in the state where the data pieces are classified by the data assembly (transaction). A data assembly is an assembly of data pieces regarding a series of processes executed in the bus master.

The connection controller 410 is a circuit that determines, for each bus interface, the buffer 409, which is the transmission destination of data pieces. For determining the buffer 409, the connection controller 410 refers, regarding the data pieces stored on the buffer 409, to the order information on the data pieces stored on the order storage 408, the change permission/rejection information that is stored on the change permission/rejection information storage 407 and indicates whether or not the order of data pieces is permitted to be changed, bus interface information that is stored on the IF information storage and is used for transmitting data pieces to the bus master 402.

The sorting rule storage 412 is a memory that stores a sorting rule defining the correspondence between the packet transmitted from the memories 403 and the partial buffer of the buffer 409 on which the packet is to be stored.

The sorter 413 is a circuit that stores data pieces on the buffer 409 based on the sorting rule stored on the sorting rule storage 412. For storing data pieces on the buffer 409, the sorter 413 distinguishes which memory has transmitted each data piece and stores the data piece on the corresponding buffer.

The bus master 402 transmits data pieces and also notifies the bus control device 401a of a transaction ID that identifies a data assembly (transaction) including data pieces that are to be processed in association with one another. The transaction ID is notified for each of types of application or bus master.

FIG. 6 shows an example of change permission/rejection information stored on the change permission/rejection information storage 407. The change permission/rejection information includes a transaction ID that identifies a data assembly (transaction) regarding a series of processes for each type of application or bus master and also includes information on whether or not the order of the data pieces belonging to the transaction is permitted to be changed.

In the example shown in FIG. 6, the order of data pieces identified with transaction ID 0 and the order of data pieces identified with transaction ID N are not permitted by the bus master 402 to be changed on the transmission path. Therefore, the order change is stored as "rejected" for each of the transaction IDs. By contrast, the order of data pieces identified with transaction ID 1 and the order of data pieces identified with transaction ID 2 are permitted by the bus master 402 to be changed on the transmission path. Therefore, the order change is stored as "permitted" for each of the transaction IDs.

The expressions "rejected" and "permitted" are merely examples. Any expression or symbol by which it is distinguished whether or not the order of data pieces is permitted to be changed is usable. For example, 0 and 1 are usable.

In the example shown in FIG. 6, whether or not the order of data pieces is permitted to be changed is shown for each transaction ID. Alternatively, whether or not the order of data pieces is permitted to be changed may be determined for each slave that has returned the data piece (for each memory or input/output device I/O), based on the form of use thereof. For example, the change permission/rejection information may be determined as shown in FIG. 7. In FIG. 7, the order of response data pieces from memory 1 and the order of response data pieces from memory m, memory 1 and memory m being are always used independently by the bus master, are permitted to be changed. The order of response data pieces from memories, each of which is always used together with another slave (combination of memory 1 and memory 3, combination of memory 2 and memory 4), is not permitted to be changed.

FIG. 8 shows an example of order information stored on the order storage 408.

As shown in FIG. 8, the order information includes data IDs that identify data pieces in the order in which the bus master 402 has transmitted the data pieces to the memories and also includes transaction IDs that identify the transactions to which the data pieces belong.

The data ID is assigned by the transmission controller 406 at the time of transmission of the corresponding data piece. The transaction ID is managed by the bus master 402 and is notified to the bus control device 401a at the same time as the transmission of the corresponding data pieces.

In the example shown in FIG. 8, the data IDs assigned to the data pieces transmitted by the bus master 402 in the order in which the data pieces are transmitted and the transaction IDs notified by the bus master are stored on the order storage 408.

FIG. 9 shows an example of IF information stored on the IF information storage 411.

The IF information includes transaction IDs that specify transactions and identification numbers of the bus interfaces used to transmit data pieces to the bus master 402. The identification numbers are each provided for one transaction.

In the example shown in FIG. 9, the correspondence between the transaction ID that identifies a data assembly regarding a series of processes for each type of application or bus master, and the bus interface ID, is stored.

Figures 10, 11:
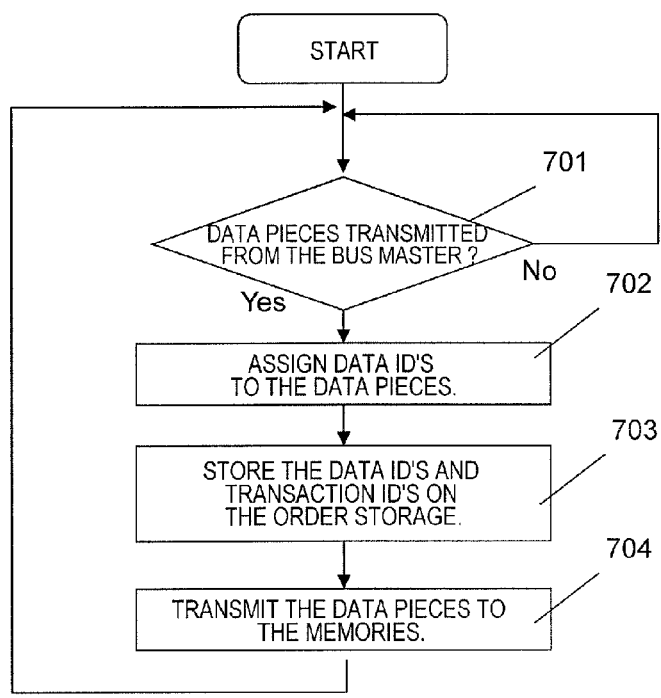
FIG. 10 shows an example of sorting rule stored on a storing rule storage 412.
FIG. 11 shows a procedure of an operation performed by the bus control device 401*a* to transmit data pieces from a bus master 402 to a plurality of memories 403.

FIG. 10 shows an example of sorting rule stored on the storing rule storage 412. The sorting rule defines the correspondence between memory ID that identifies a memory which has transmitted the data pieces and the partial buffer of the buffer 409 on which the data pieces are to be stored. The memory ID can be acquired by referring to a value described in a header information part in a packet. FIG. 11 shows a procedure of an operation performed by the bus control device 401a to transmit data pieces from the bus master 402 to the plurality of memories 403.

With reference to FIG. 11, an example in which the order of the data pieces transmitted from the bus master 402 is managed by the information storage 408 will be described.

In step 701, the transmission controller 406 of the bus control device 401a determines whether or not a data piece has been transmitted from the bus master 402. When a data piece has been transmitted, the operation advances to step 702. When no data piece has been transmitted, the operation in step 701 is repeated.

In step 702, the transmission controller 406 assigns, to data pieces transmitted from the bus master 402, data IDs that identify the respective data pieces.

In step 703, the transmission controller 406 stores the data IDs assigned to the data pieces and the transaction IDs notified by the bus master 402 on the order storage 408 in the order in which the data pieces have been transmitted.

In step 704, the transmission controller 406 transmits the data pieces to the memories 403, which are the destinations.

By repetition of the above-described steps, the bus control device 401a can assign, to data pieces transmitted from the bus master 402, data IDs that identify the data pieces, and store the transmission order of the data pieces together with the transaction IDs.

Figure 12:
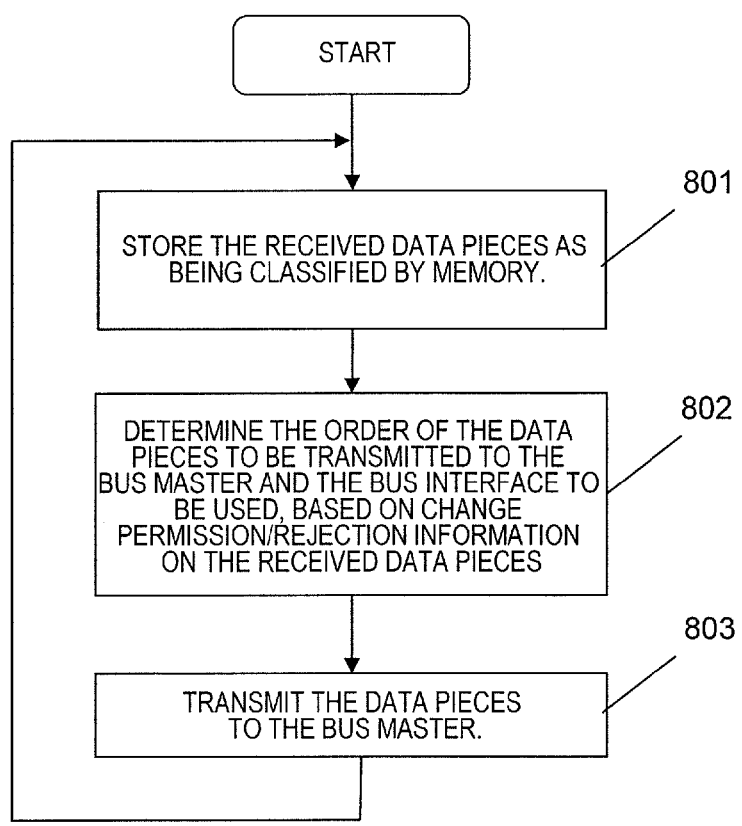
FIG. 12 shows a procedure of an operation performed by the bus control device 401*a* when data pieces from the plurality of memories 403 are received by the bus control device 401*a*.

FIG. 12 shows an overview of a procedure of an operation performed by the bus control device 401a when data pieces from the plurality of memories 403 are received by the bus control device 401a.

In step 801, the sorter 413 stores the data pieces transmitted from the memories 403 on the partial buffers of the buffer 409 in the state where the data pieces are classified by the memory 403, based on the sorting rule stored on the sorting rule storage 412.

The operation in step 801 will be described in more detail. The sorter 413 receives the data pieces included in each of packets transmitted from the memories 403 and also header information in each packet. The sorter 413 refers to the header information to specify the memory ID of the memory that has transmitted the packets. Next, the sorter 413 refers to the order information (FIG. 8) stored on the order storage 408 to specify the transaction ID from the data ID described in the header information in each packet.

The sorter 413 refers to the change permission/rejection information (FIG. 6 or FIG. 7) stored on the change permission/rejection information storage 407 to specify, based on the transaction ID, whether or not the order of the packets is permitted to be changed on the transmission path. The sorter 413 refers to the sorting rule (FIG. 10) stored on the sorting rule storage 412 to specify the partial buffer of the buffer 409 on which the packets are to be stored, based on the memory ID of the memory that has transmitted the packets and whether or not the order of the packets is permitted to be changed on the transmission path. In this manner, the sorter 413 stores the packets transmitted from the memory 403 on the partial buffer of the buffer 409.

In step 802, the connection controller 410 sequentially determines the partial buffers of the buffer 409 which are to transmit the data pieces via each bus interface of the bus master 402, in accordance with whether or not the order of the data pieces is permitted to be changed. This will be described specifically. The connection controller 410 refers to the change permission/rejection information (FIG. 6 of FIG. 7) stored on the change permission/rejection information storage 407. The connection controller 410 sequentially determines the partial buffers such that the data pieces, the order of which is not permitted to be changed, are transmitted from the partial buffers of the buffer 409 to the bus master 402 in the same order as the order in which the data pieces have been transmitted from the bus master 402 to the memories 403. The connection controller 410 transmits the data pieces, the order of which is permitted to be changed, in the order in which the data pieces have been stored on the partial buffers.

The operation of the connection controller 410 will be described in more detail later with reference to FIG. 13.

There are cases where it is determined that the order of none of the data pieces is permitted to be changed because of the type of the bus master, the application or the use case. Namely, there are cases where the change permission/rejection information defines that the change of the order of all the data pieces is rejected. In such a case, in step 801, the operation by the sorter 413 of referring to the change permission/rejection information may be omitted. In step 803, the operation by the connection controller 410 of referring to the change permission/rejection information may be omitted.

In step 803, the connection controller 410 transmits the data pieces from the buffer 409 determined for each bus interface to the bus master 402.

By repetition of the above-described steps, the data pieces are transmitted from the plurality of memories 403 to the bus master 402.

In the above description with reference to FIG. 12, the data pieces transmitted from the memories 403 are stored on the partial buffers of the buffer 409 in the state of being classified by the memory 403, based on the sorting rule stored on the sorting rule storage 412. Alternatively, the partial buffers of the buffer 409 on which each response data piece is to be stored may be described in advance in the header information on the response data piece, so that the sorter 413 can store the response data piece on a partial buffer of the buffer 409 based on the header information. It is conceivable to describe, in the header information, the partial buffer of the buffer 409 on which the data piece is to be stored, in the following method, for example. At the time of transmission of the data piece from the bus master 402 to the memory 403, information on the partial buffer stored on the sorting rule storage 412 is described by a packetizer 1101 in the header information, and the information on the partial buffer is described by the memory 403 in the header information on the response data piece to be transmitted to the bus master 402.

Figure 13:
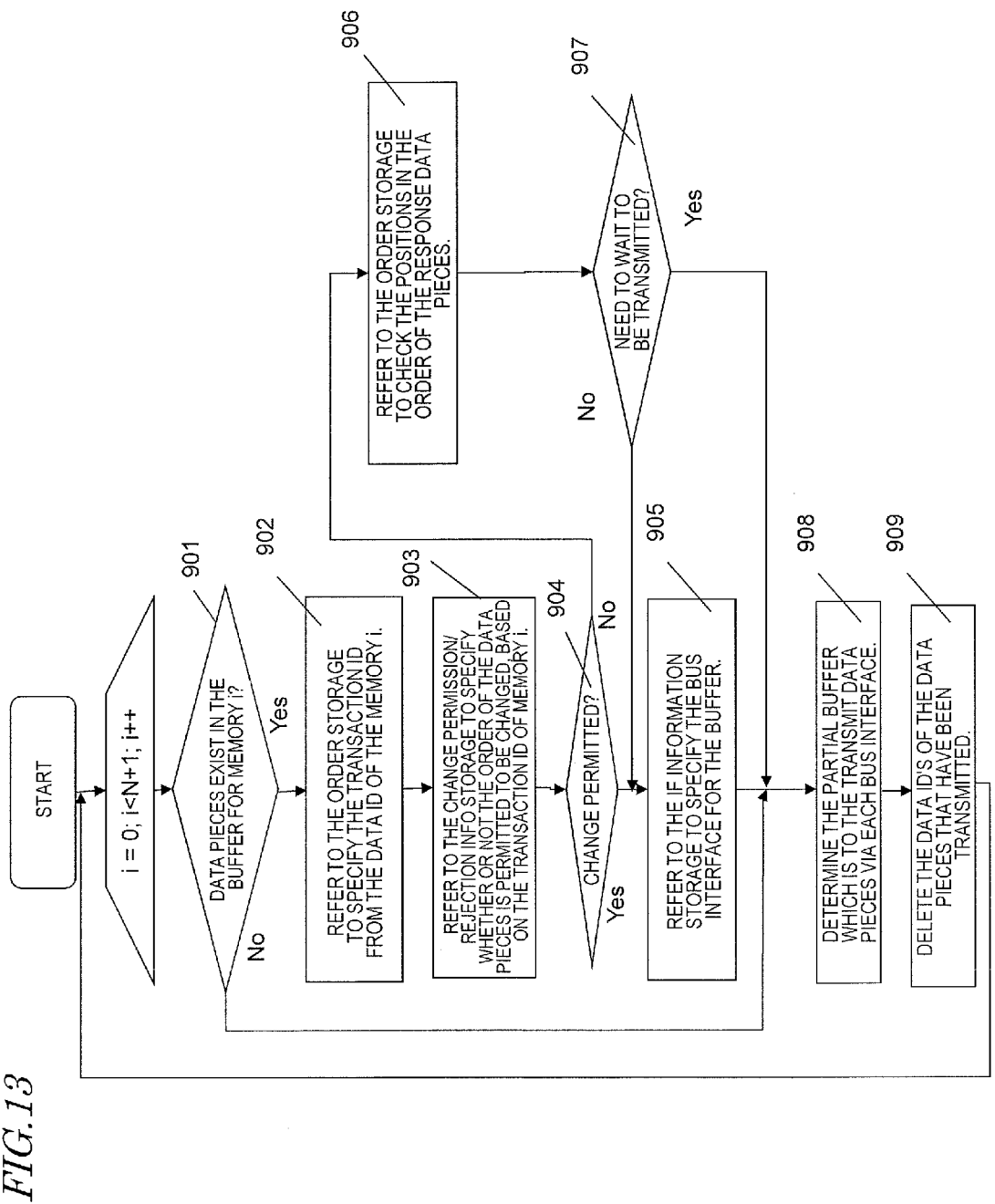
FIG. 13 shows a procedure of an operation performed by a connection controller 410.

FIG. 13 shows a procedure of the operation performed by the connection controller 410. In order to transmit the data pieces, which have been transmitted from the memories 403 and the order of which is not permitted to be changed, to the bus master 402 in the same order as the order in which the data pieces have been transmitted from the bus master 402 to the memories 403, the connection controller 410 determines, for each bus interface, the data pieces to be transmitted to the bus master 402 from the buffer. The connection controller 410 executes steps 901 through 907 described below on the buffers 409 provided in correspondence with the memories 403.

In step 901, the connection controller 410 determines whether or not data pieces are stored on the buffer 409. When data pieces are stored, the operation advances to step 902. When no data piece is stored, the operation advances to a process on the buffers 409 for the other memories 403.

In step 902, the connection controller 410 refers to the order storage 408 to specify the transaction ID based on the data ID of the data pieces stored on the buffer.

In step 903, the connection controller 410 refers to the change permission/rejection information storage 407 to specify whether or not the order of the data pieces is permitted to be changed on the transmission path, based on the corresponding transaction ID.

In step 904, the connection controller 410 determines whether or not the order of the data pieces is permitted to be changed on the transmission path. When the order of the data pieces is permitted to be changed, the operation advances to step 905. When the order of the data pieces is not permitted to be changed on the transmission path, the operation advances to step 906.

In step 905, the connection controller 410 refers to the IF information storage 411 to specify the bus interface via which the data pieces are to be transmitted to the bus master 402, based on the transaction ID of the data pieces.

In step 906, the connection controller 410 refers to the order storage 408 to check whether or not the data pieces having the same transaction ID includes a data piece that has an earlier transmission time and should be transmitted to the bus master 402 prior to the other data pieces. A reason for executing this step is that the data pieces, the order of which is not permitted to be changed on the transmission path, need to be transmitted to the bus master 402 in the same order as the order in which the data pieces have been transmitted from the bus master 402 to the memories 403.

In step 907, when there is no data piece to be transmitted to the bus master 402 prior to the other data pieces, the operation advances to step 905. When there is a data piece to be transmitted to the bus master 402 prior to the other data pieces, the operation advances to step 908.

In step 908, the connection controller 410 refers to the IF information storage 411 to determine the partial buffer of the buffer 409 which is to transmit the data pieces via each bus interface. When there are a plurality of partial buffers that use the same bus interface, the data IDs stored on the partial buffers are compared, and the partial buffer storing the data piece transmitted from the bus master 402 prior to all the other data pieces (having the earliest transmission time) is selected.

For selecting a partial buffer which is to transmit the data pieces via each bus interface, methods other than the method of comparing the data IDs and selecting the partial buffer based on the transmission time may be used. For example, in the case where the data pieces are assigned additional information such as the priority level or the deadline time, the data piece having the highest priority level or the closest deadline time may be selected.

In step 909, the connection controller 410 deletes, from the order storage 408, the data IDs of the data pieces that have been transmitted from the buffer 409 to the bus master 402, and the operation returns to step 901.

In order to transmit data pieces to the bus master 402 in the same order as the order in which the data pieces have been transmitted from the bus master 402 to the memories 403, the connection controller 910 repeats the operations in steps 901 through 909 described above to determine the data pieces to be transmitted from the partial buffer to the bus master 402 via each bus interface.

Figure 14:
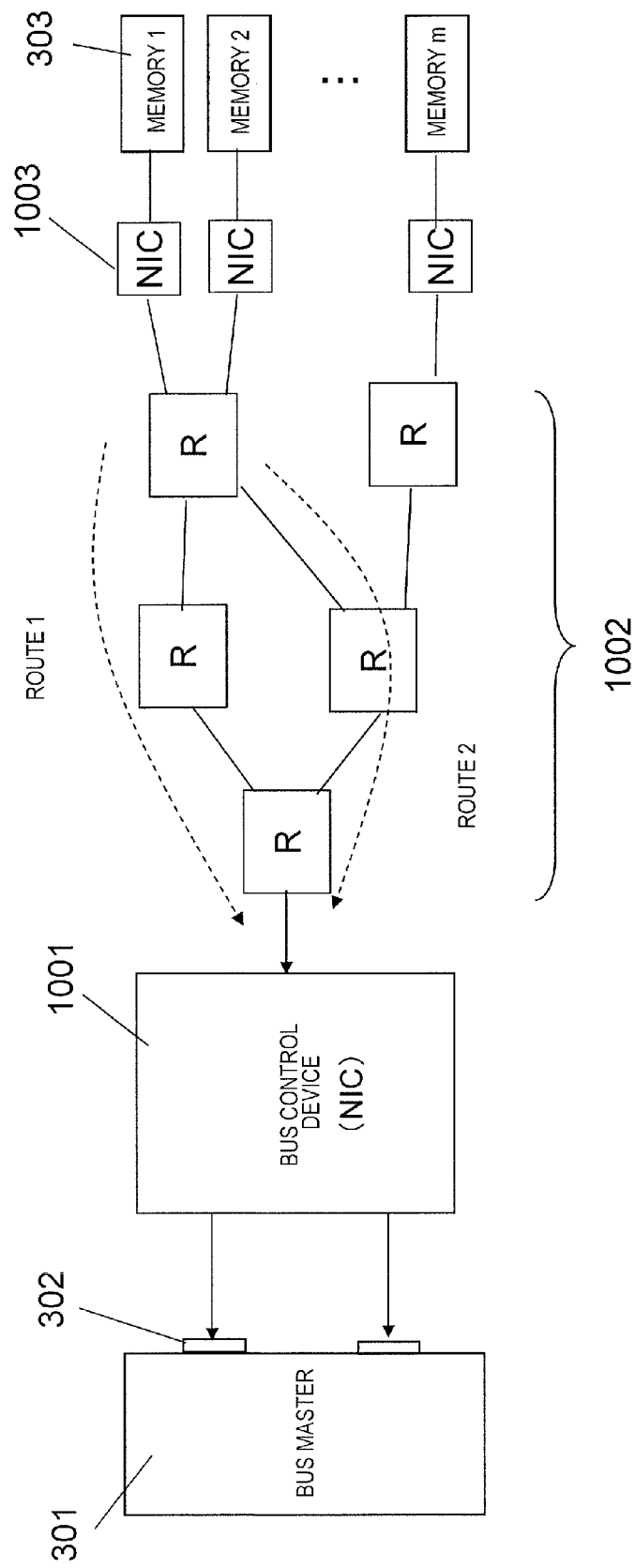
FIG. 14 shows an example in which at least a part of a transmission path that connects a bus master 301 and a plurality of memories 303 to each other is shared.

FIG. 14 shows an example in which at least a part of the transmission path that connects the bus master 301 and the plurality of memories 303 to each other is shared. FIG. 14 shows route 1 and route 2. Route 1 and route 2 partially use the same relay devices and the same transmission path. With the structure of the bus control device 401a shown in FIG. 5, the bus control device 401a and the plurality of memories 403 are directly connected to each other. Alternatively, the transmission path may be shared by the memories as shown in FIG. 14.

FIG. 14 shows a structure in which the bus master 301 and the plurality of memories 303 are connected to each other by use of an NoC, which is a network of transmission paths. In the NoC, data pieces transmitted and received by the bus master is converted into a packet by an NIC 1001 and transmitted by a packet exchange system to memories 303, which are the destinations via relay devices 1002.

NICs 1003 provided between the relay devices 1002 and the memories 303 each perform a conversion on a bus protocol when transmitting a packet received from the relay devices 1002 to the memory 303.

Hereinafter, a bus control device having an NIC function will be described. The bus control device is provided between the bus master and a system bus.

Figure 15:
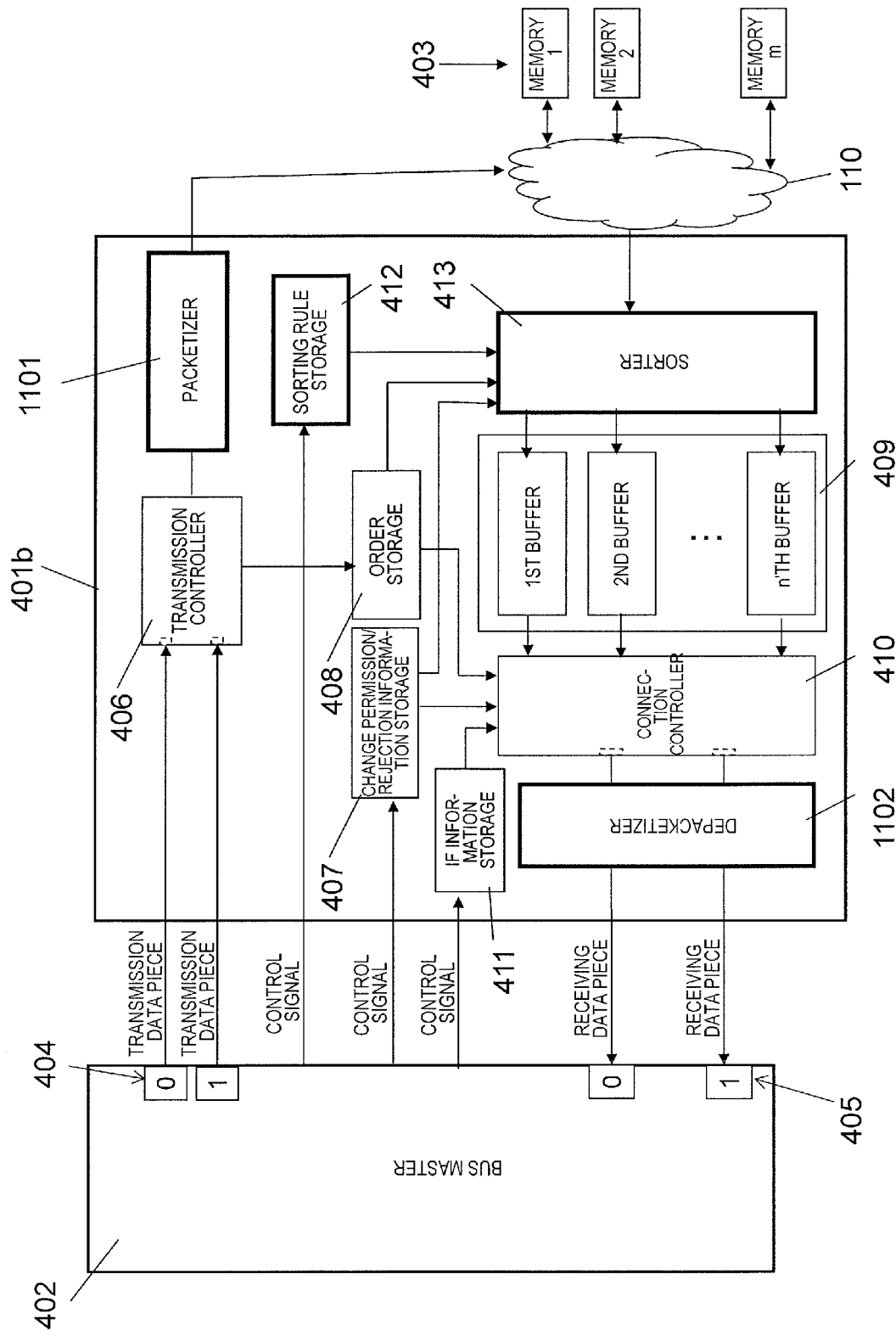
FIG. 15 shows a structure of a bus control device 401b having an NIC function.

FIG. 15 shows a structure of a bus control device 401b having an NIC function. The bus control device 401b corresponds to the bus control device shown in FIG. 4.

Elements having the same functions as those of the elements of the bus control device 401a shown in FIG. 5 will bear the same reference signs therewith, and descriptions thereof will be omitted. It should be noted that even elements having the same function may be described for easier understanding.

The buffer 409 is a storage device (e.g., SRAM) that stores packets, including data pieces, transmitted from the memories 403 in the state where the packets are classified by the memory. The buffer 409 includes a plurality of partial buffers. FIG. 15 shows first through n'th buffers as the partial buffers. The buffer 409 may be divided into a plurality of partial buffers physically or logically as long as the packets from the memories are stored as being classified by the memory.

A packetizer 1101 is a circuit that converts data pieces transmitted from the bus master 402 into a packet in order to transmit the data pieces to the NoC. The packet includes header information, which is required to relay the data pieces on the NoC and data pieces as the target of transmission. The header information includes an ID (address) that identifies the bus master and a memory which are respectively the transmission source and the transmission destination, and a data ID that identifies each data piece.

A depacketizer 1102 is a circuit that converts a packet transmitted from a memory 403 via the NoC into data pieces to be transmitted to the bus master 402.

FIGS. 16A and 16B each show an example of sorting rule stored on the sorting rule storage 412. The sorting rule storage 412 may store the sorting rule shown in FIG. 10 instead of the examples shown in FIGS. 16A and 16B.

The buffer 409 that stores a packet may be assigned as follows. For example, in accordance with the data size of each response packet from the memory 403, a larger number of buffers 409 may be assigned to one memory, or one buffer 409 may be shared by a plurality of memories 403.

Packets, the order of which is permitted by the bus master to be changed, do not need to be changed in the order, and therefore may be stored on the buffer as being classified from packets, the order of which is not permitted to be changed.

According to the sorting rule shown in FIG. 16A, the partial buffer of the buffer 409 on which packets from the memory 403 are to be stored is defined in consideration of the memory ID and also whether or not the order of the packets is permitted by the bus master to be changed on the transmission path.

In the case where the sorting rule shown in FIG. 16A is used, packets, the order of which is permitted to be changed, can be handled by one buffer. Therefore, the number or the size of the buffers 409 required in the bus control device 401b can be decreased, so that the mounting surface area and the power consumption can be decreased.

In the example of sorting rule shown in FIG. 16B and stored on the packet sorting rule storage 412, the packets are stored on the buffer as being classified by the transmission route.

As shown in FIG. 14, in the NoC, a topology can be configured in which a plurality of routes of the transmission path are usable from the memories 303 to the bus master 301. In the case where a plurality of routes are usable, data pieces can be transmitted via different routes in parallel, so that a wider transmission band is usable. It should be noted that even when packets are transmitted from the same memory 303, if the packets are received by the bus master 301 via different routes, the order of the packets may be changed. In order to deal with such a change of the order of the packets that is caused by use of the different transmission routes, the packets may be stored on the buffer in the state of being classified by the memory ID and also by the route via which each packet has transmitted.

According to the sorting rule shown in FIG. 16(B), the partial buffer of the buffer 409 on which packets from the memory 403 are to be stored is defined in consideration of the memory ID and also the transmission route of each of packets.

In the topology in which a plurality of routes are usable, which route is to be used by each packet needs to be described in the header information at the time of transmission. Therefore, the bus control device 401b can specify the route by which the packet has been transmitted by referring to the header information in the packet.

Figure 17:
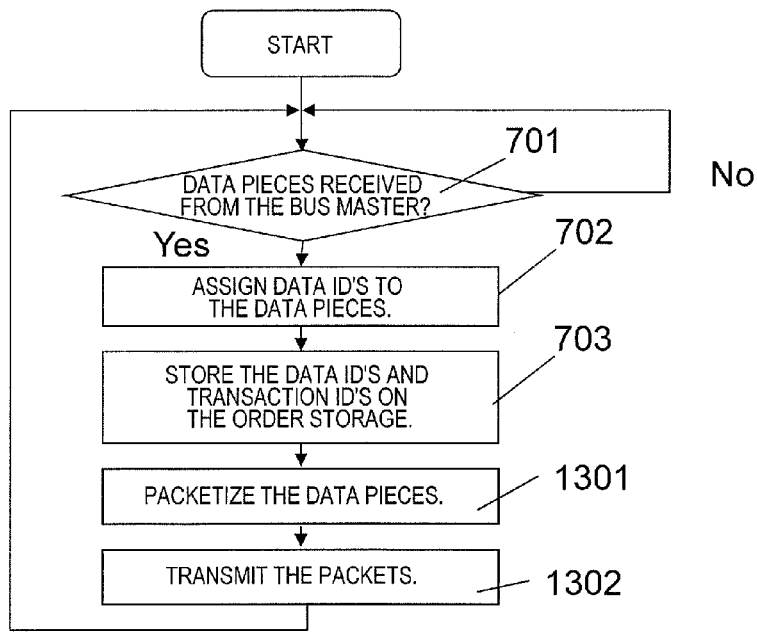
FIG. 17 shows a procedure of an operation performed by the bus control device 401b to transmit data pieces from the bus master 402 to the memories 403.

FIG. 17 shows a procedure of an operation performed by the bus control device 401b to transmit data pieces from the bus master 402 to the memories 403.

Steps which are the same as those shown in FIG. 11 will bear the same reference signs therewith, and descriptions thereof will be omitted.

In step 1301, the bus control device 401b assigns, to data pieces transmitted from the bus master 402, header information including information required for a relay process on the NoC, and packetizes the data pieces, by use of the packetizer 1101.

In step 1302, the bus control device 401b transmits packets to the NoC from the packetizer 1101.

By repetition of the above-described steps, the bus control device 401b transmits packets each including the data pieces transmitted from the bus master 402 and data IDs that identify the data pieces, and stores the transmission order of the data pieces together with transaction IDs.

Figure 18:
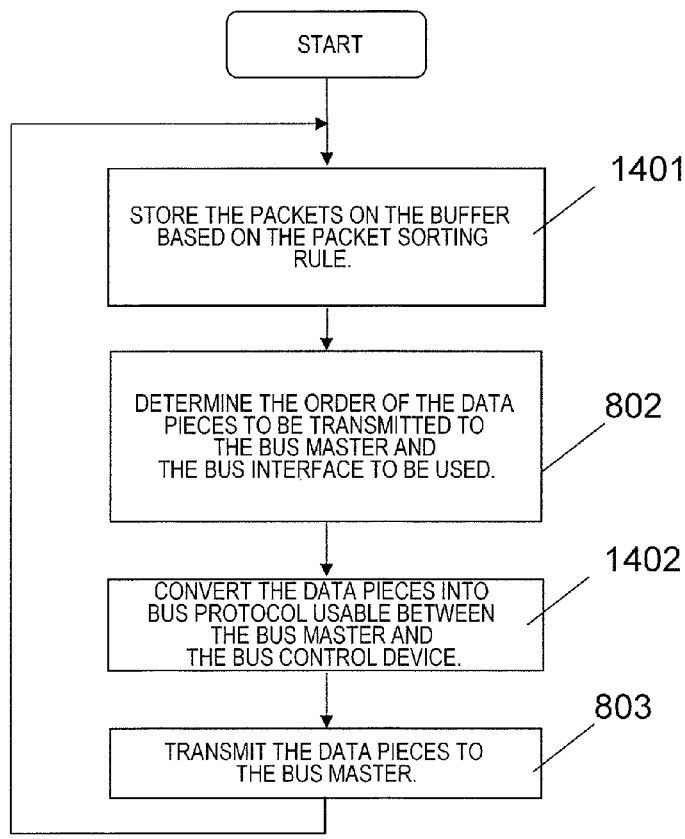
FIG. 18 shows a procedure of an operation performed by the bus control device 401b when data pieces transmitted from the memories 403 are received by the bus control device 401b.

FIG. 18 shows a procedure of an operation performed by the bus control device 401b when data pieces transmitted from the memories 403 are received by the bus control device 401b.

Steps which are the same as those shown in FIG. 12 will bear the same reference signs therewith, and descriptions thereof will be omitted.

In step 1401, the sorter 413 stores packets transmitted from the memories 403 on the buffer 409 in the state where the packets are classified by the memory. The operation of the sorter 413 will be described in more detail later with reference to FIG. 19.

In step 1402, the depacketizer 1102 converts the data pieces included in each of the received packets into a bus protocol usable between the bus master 402 and the bus control device 401b in order to transmit the data pieces included in the received packets to the bus master 402.

By repetition of steps 1401, 802, 1402 and 803 described above, the data pieces included in the packets transmitted from the memories 403 are transmitted to the bus master 402.

Figures 19, 20:
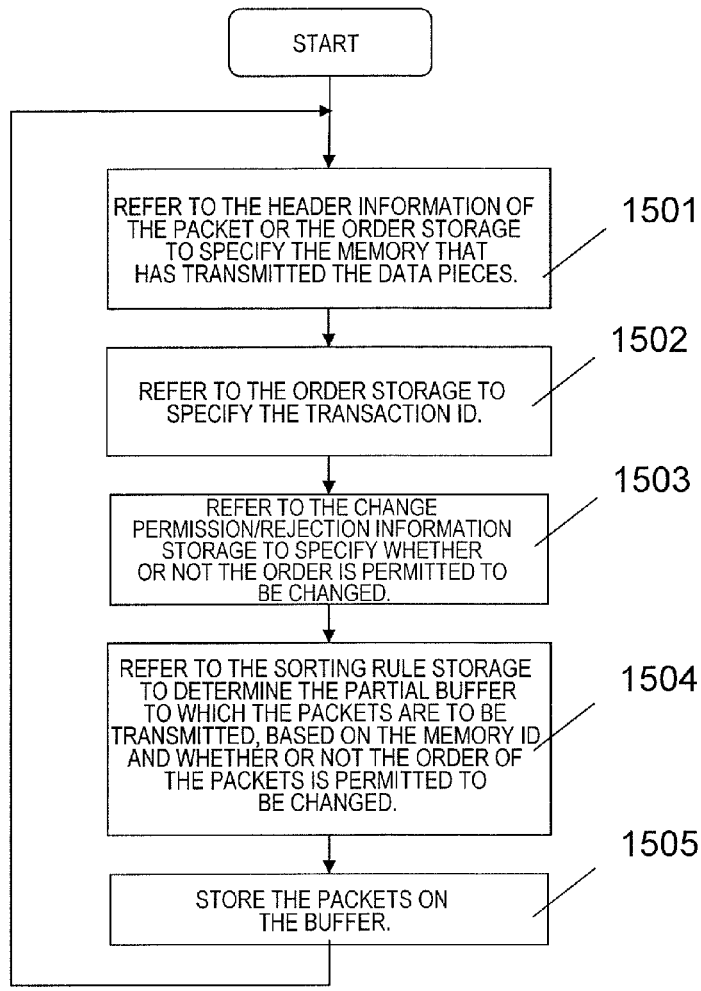
FIG. 19 shows a procedure of an operation performed by a sorter 413.
FIG. 20 shows an example of order information that describes, for each transaction, a data ID of data pieces which have been transmitted from the memory 403 to the bus master 402.

FIG. 19 shows a procedure of the operation performed by the sorter 413.

The sorter 413 stores each of the packets transmitted from the memories 403 to the corresponding partial buffer of the buffer 409 based on the sorting rule (FIG. 10, FIG. 16) stored on the sorting rule storage 412.

In step 1501, the sorter 413 refers to the header information in each of the packets transmitted from each of the memories 403 or the order information stored on the order storage 408 to specify an ID of the memory (memory ID) which has transmitted the packets. In the case where the header information in the packet is used, the sorting rule shown in, for example, FIG. 10 is usable. The order information is used to specify the transaction ID. Once the transaction ID is specified, the memory with which the data pieces are transferred can be specified. In step 1502, the sorter 413 refers to the order storage 408 to specify the transaction ID based on the data ID described in the header information in the packet.

In step 1503, the sorter 413 refers to the change permission/rejection information storage 407 to specify, based on the transaction ID, whether or not the order of the packets is permitted to be changed on the transmission path.

In step 1504, the sorter 413 refers to the sorting rule storage 412 to specify the partial buffer of the buffer 409 on which the packets are to be stored, based on the memory ID of the memory that has transmitted the packets and whether or not the order of the packets is permitted to be changed on the transmission path.

In step 1505, the sorter 413 stores the packets transmitted from the memory 403 on the buffer 409.

By execution of steps 1501 through 1505, the packets, the order of which is not permitted by the bus master 402 to be changed can be stored on the buffer 409 in the state of being classified by the memory.

In this embodiment, the order of the data pieces transmitted from the bus master 402 to the memories 403 is stored on the order storage 408, and the connection controller 410 selects the buffer which is to transmit the data pieces to the bus master 402 based on the order stored on the order storage 408. Alternatively, in the case where the data IDs are managed by serial numbers in each transaction, the bus control device 401b may not need to manage the data IDs of the data pieces that have been transmitted. Instead, number X of the data ID of each data piece which has been transmitted from each of the memories 403 to the bus master 402 may be managed for each transaction, and based on the number X, the data piece to be transmitted next (ID number: X+1) to the bus master 402 may be specified.

FIG. 20 shows an example of order information that describes, for each transaction, the data ID of the data piece which has been transmitted from the memory 403 to the bus master 402.

In the case where the order information shown in FIG. 20 is used, the connection controller 410 refers to the order management information stored on the order storage 408 to select, for each transaction ID, the data piece having the data ID assigned the number next to the number of the data ID of the data piece which has been transmitted, so that the data piece to be transmitted to the bus master 402 is selected.

Upon transmitting the data piece to the bus master 402, the connection controller 410 updates the data ID stored on the order storage 408 to the data ID of the latest transmitted data piece.

The transaction ID is described in the header information in a packet and is transmitted together with the packet. The IF information storage 411, the change permission/rejection information storage 407 and the sorter 413 each acquire necessary information based on the transaction ID described in the packet.

In each of the above examples, the bus control device 401a or 401b is provided adjacent to the bus master 402. Alternatively, the bus control device may be provided in a part of a relay device that relays data pieces from a plurality of memories on the transmission path.

Figure 21:
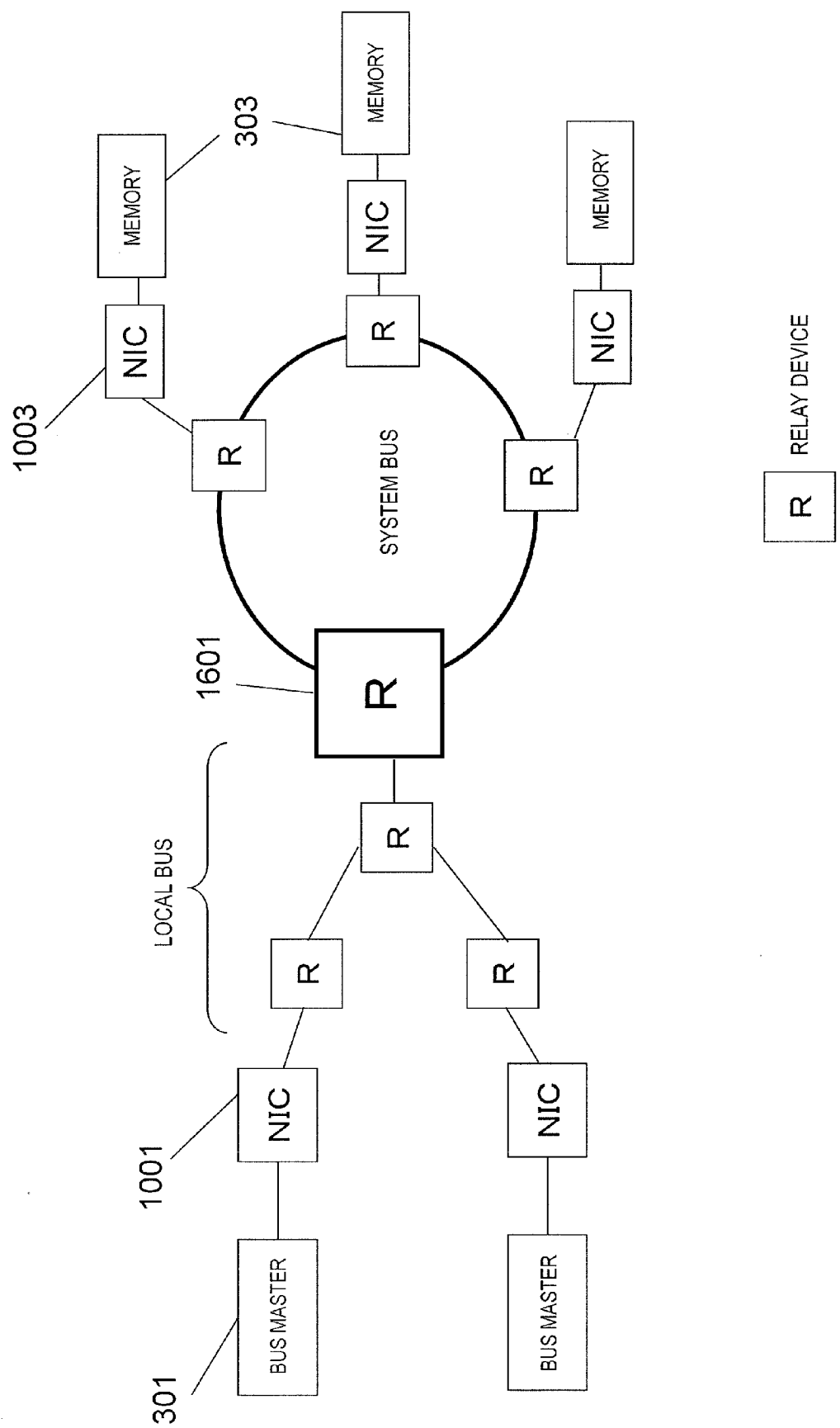
FIG. 21 shows a structure in which a plurality of bus masters 301 connected to each other via a local bus communicate with the plurality of memories 303 connected to each other via a system bus.

FIG. 21 shows a structure in which a plurality of bus masters 301 connected to each other via a local bus communicate with a plurality of memories 303 connected to each other via a system bus. Elements which are the same as those shown in FIG. 14 will bear the same reference signs therewith, and descriptions thereof will be omitted. In this example, the local bus has a relatively narrow transmission band, and the transmission band has a relatively low transmission rate. By contrast, the system bus has a relatively wide transmission band, and the transmission band has a relatively high transmission rate.

Hereinafter, an example in which a bus control device 401 is configured in a relay device 1601 that connects the local bus and the system bus to each other will be described.

Figure 22:
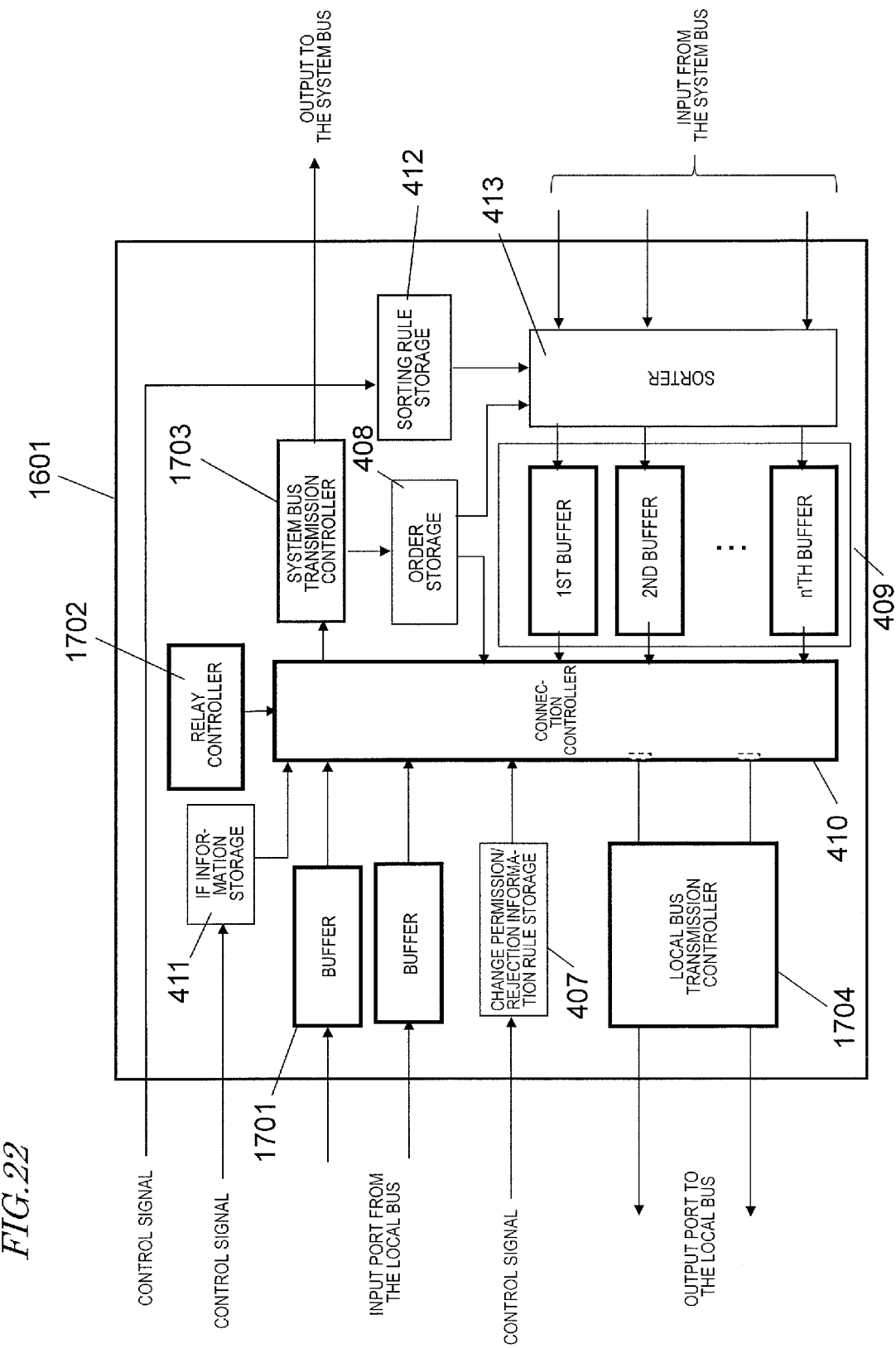
FIG. 22 shows an example of structure of the relay device having a bus control device.

FIG. 22 shows a structure of the relay device 1601 having a function of a bus control device according to this disclosure.

The relay device 1601 includes elements having equivalent functions to those of the elements of the bus control device 401a shown in FIG. 5 and/or the bus control device 401b shown in FIG. 15. Such elements will bear the same reference signs therewith, and descriptions thereof will be omitted.

The connection controller 410 in the relay device 1601 is capable of switching connection for both of the local bus and the system bus. For example, it is assumed that a memory exists in the local network including a bus master, and the bus master accesses both of a memory connected thereto via the system bus and the memory in the same local network. In this case, the connection controller 410 can switch the bus connection such that response data pieces from a memory connected to the bus master via the system bus can be transmitted from the system bus to the local bus, whereas response data pieces from the memory on the local bus can be directly transmitted within the local bus.

Relay buffers 1701 are each a storage device (e.g., SRAM) that stores a packet transmitted from the local bus.

A relay controller 1702 is a circuit that determines an output port via which a packet received from the system bus and stored on the buffer 409 or a packet received from the local bus and stored on one of the buffers 1701 is output to a corresponding destination.

The connection controller 410 in the relay device 1601 determines the transmission order of packets in each of packet assemblies. The packet assemblies each include a plurality of packets that are stored on the buffer 409 or one of the buffers 1701 and have the same output port.

A system bus transmission controller 1703 is a circuit that transmits packets in accordance with the bus width or the operating frequency of the system bus. A local bus transmission controller 1704 is a circuit that transmits packets in accordance with the bus width or the operating frequency of the local bus.

The buffer 409 and the buffers 1701 may each be realized by a part of a buffer storing packets at the time of route control on the packets performed by the relay device. For transmitting packets from the system bus to the local bus, a rate difference absorption buffer having a capacity that is sufficiently large to store all the packets transmitted from the memories 403 is used in order to absorb the rate difference between the buses. Therefore, a part of a storage area of the rate difference absorption buffer may be used as the buffer 409.

FIGS. 23A and 23B each show an example of sorting rule stored on the sorting rule storage 412 in the relay device 1601.

In the relay device 1601, data pieces are transmitted and received between the plurality of bus masters 402 and the plurality of memories 403. Therefore, the memory IDs and IDs that identify the bus masters are also considered for the sorting rule stored on the sorting rule storage 412.

The example of sorting rule shown in FIG. 23A is based on the memories and the bus masters. More specifically, the sorting rule shown in FIG. 23A defines the correspondence between the combination of the memory ID of the memory that has transmitted the packet and the bus master ID of the bus master as the destination of the packet, and the partial buffer of the buffer 409 on which the packet is to be stored. Packets, the order of which is permitted by the bus master to be changed do not need to be changed in the order, and therefore may be stored on the buffer 409 as being classified from packets, the order of which is not permitted to be changed.

The example of sorting rule shown in FIG. 23B considers the type of packets. According to the sorting rule shown in FIG. 23B, the partial buffer of the buffer 409 on which packets are to be stored is defined in consideration of the combination of the memory ID of the memory which has transmitted the packets and the bus master ID of the bus master as the destination of the packets, and also whether or not the order of the packets is permitted to be changed on the route.

A sorting rule different from those shown in FIGS. 23A and 23B may be used. According to such a sorting rule, the partial buffer of the buffer 409 on which packets are to be stored may be defined in consideration of at least one of the memory ID, the bus master ID, and the change permission/rejection information on whether or not the order of the packets is permitted to be changed.

Figure 24:
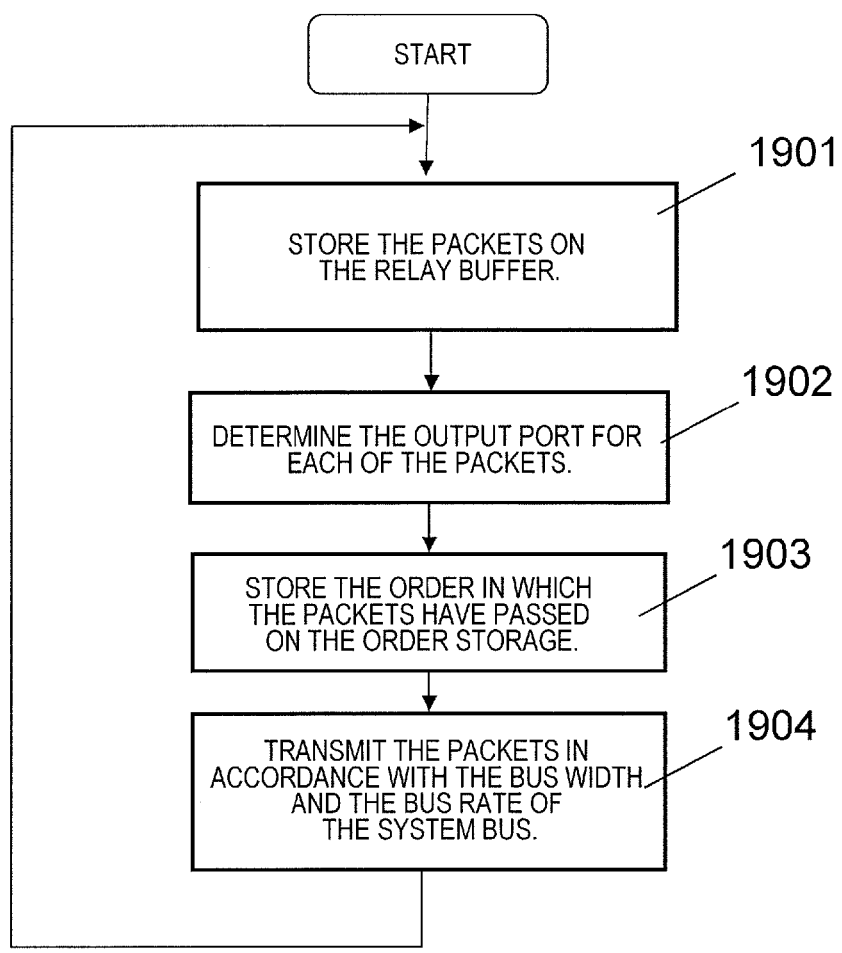
FIG. 24 shows an operation performed by the relay device 1601 to transmit data pieces from the local bus to the system bus.

FIG. 24 shows an operation performed by the relay device 1601 to transmit data pieces from the local bus to the system bus. As an example, an operation of the relay device 1601 for transferring packets from each bus master 301 to the plurality of memories 303 shown in FIG. 21 will be described.

Steps which are the same as those shown in FIG. 11 and/or FIG. 17 will bear the same reference signs therewith, and descriptions thereof will be omitted.

In step 1901, each of the relay buffers 1701 in the relay device 1601 stores packets received.

In step 1902, the relay controller 1702 in the relay device 1601 refers to the header in each of the packets to determine the output port via which the packet is to be transmitted to the memory or the bus master as the destination of the packet, based on the ID (address) of the destination described in the header.

In step 1903, the system bus transmission controller 1703 sequentially stores the data IDs and the transaction IDs described in the packets on the order storage 408.

The transaction IDs are assigned by the bus master 402, and the data IDs are assigned to the header information by the NIC 1001. The transaction IDs and the data IDs are described in the header information in the respective packets by the NIC.

In step 1904, the system bus transmission controller 1703 transmits the packets in accordance with the bus width or the bus operation rate of the system bus.

By repetition of the above-described steps, the order storage 408 in the relay device 1601 accumulates the data IDs and the transaction IDs of the packets in the order in which the packets have been transmitted from the bus master 402 to the plurality of memories 403.

Figure 25:
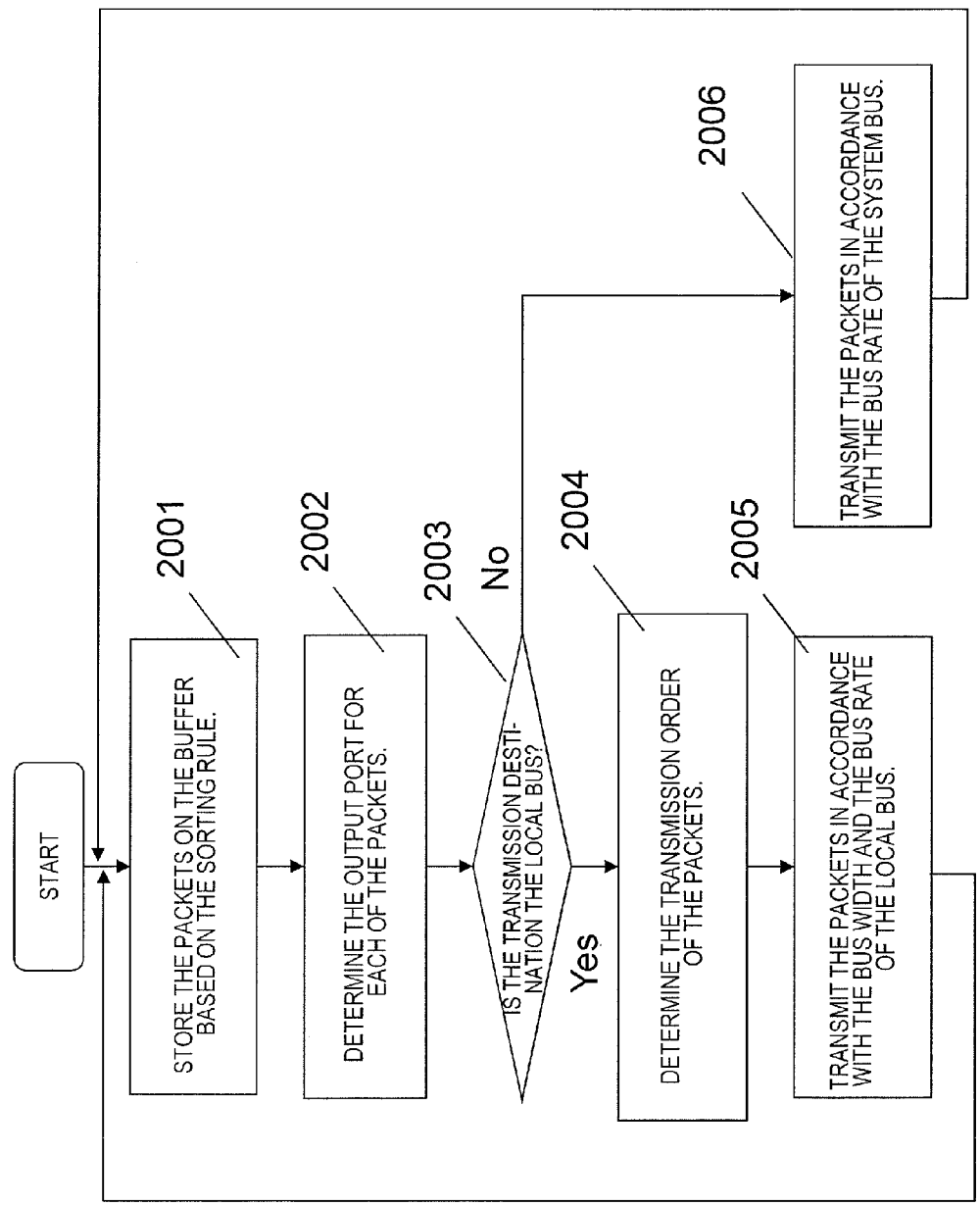
FIG. 25 shows an overview of a procedure of an operation performed by the relay device 1601 when data pieces transmitted from the plurality of memories 403 are received by the relay device 1601.

FIG. 25 shows an overview of a procedure of an operation performed by the relay device 1601 when data pieces transmitted from the plurality of memories 403 are received by the relay device 1601.

In step 2001, the sorter 413 stores the packets transmitted from the memories 403 on the buffer 409 based on the sorting rule stored on the sorting rule storage 412. The operation of the sorting rule 413 in the relay device 1601 will be described in more detail later with reference to FIG. 26.

In step 2002, the relay controller 1702 determines the output port to be connected to the transmission destination of each of the response packets, in order to transmit the response packet to the bus master, which is the final destination thereof.

In step 2003, it is determined whether the transmission destination of each packet is the local bus or the system bus. When the transmission destination is the local bus, the operation advances to step 2004. When the transmission destination is the system bus, the operation advances to step 2006.

In step 2004, the connection controller 410 determines the transmission order of the packets. Specifically, the connection controller 410 determines the buffer 409 which is to transmit the packets to the local bus via each of the output ports. The buffer 409 which is to transmit the packets is determined by the same method as described with reference to FIG. 13.

In step 2005, the local bus transmission controller 1704 transmits the packets to the local bus in accordance with the bus width or the bus operation rate of the local bus. Then, the operation returns to step 2001.

In step 2006, the system bus transmission controller 1703 transmits the packets in accordance with the bus width or the bus operation rate of the system bus. Then, the operation returns to step 2001.

By repetition of the above-described steps, the data pieces can be transmitted from the memories 403 to the bus master 402 via each output port in the order in which the data pieces have been transmitted from the bus master 402 to the memories 403.

Figure 26:
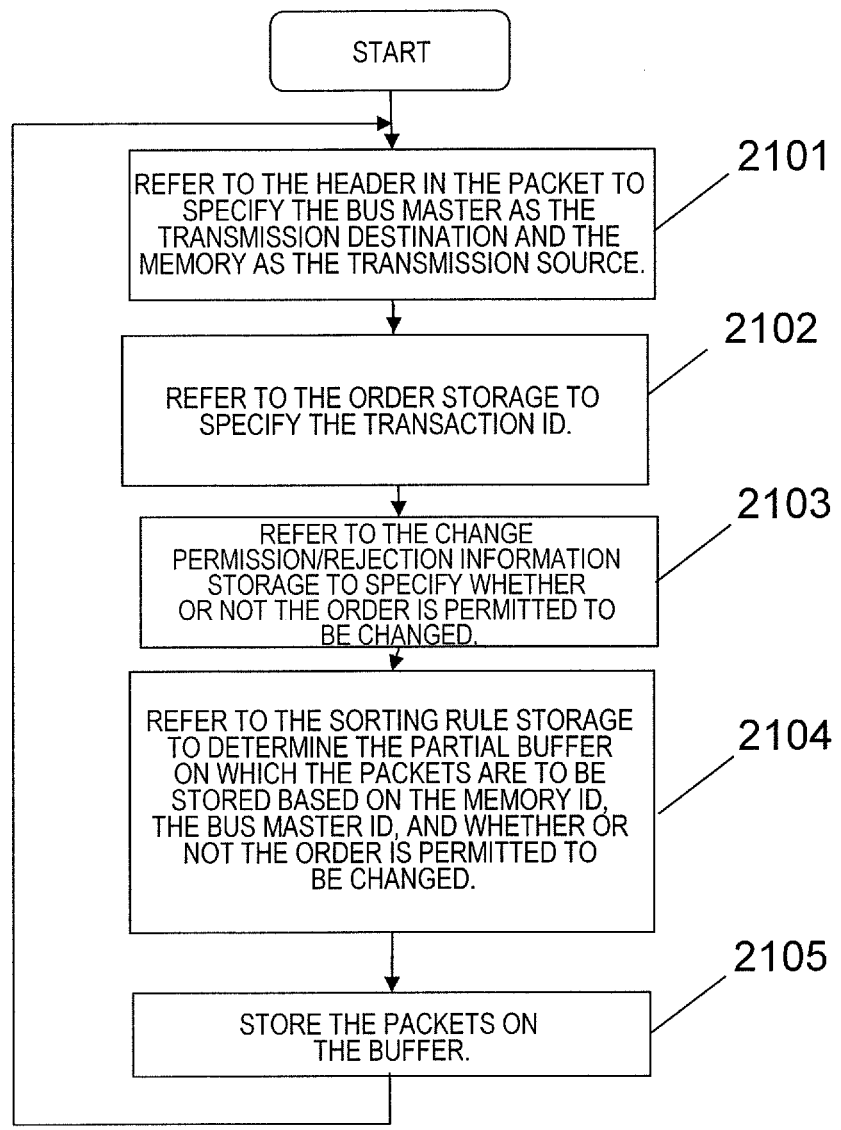
FIG. 26 shows a procedure of an operation performed by the sorter 413 in the relay device 1601 to store packets on a buffer.

FIG. 26 shows a procedure of an operation performed by the sorter 413 in the relay device 1601 to store the packets on the buffer. This procedure of the operation shows a detailed process by which the sorter 413 stores each of the packets transmitted from the memories 403 on the corresponding buffer 409 based on the sorting rule stored on the sorting rule storage 412.

In step 2101, the sorter 413 refers to the header information described in each of the packets transmitted from the memories 403 to specify the memory ID of the memory that has transmitted the packet and the bus master ID of the bus master which is the destination of the packet.

In step 2102, the sorter 413 refers to the order storage 408 to specify the transaction ID based on the data ID of the packet.

In step 2103, the sorter 413 refers to the change permission/rejection information storage 407 to specify, based on the transaction ID, whether or not the order of the packets is permitted to be changed on the transmission path.

In step 2104, the sorter 413 refers to the sorting rule storage 412 to specify the partial buffer of the buffer 409 on which the packets are to be stored, based on the memory ID and the bus master ID specified above and whether or not the order of the packets is permitted to be changed on the transmission path.

In step 2105, the sorter 413 stores the packets transmitted from the memories 403 on the buffer 409.

By execution of the above-described steps, the packets transmitted from the plurality of memories 403 can be stored on the buffer 409 in the state of being classified by the memory, based on the memory ID of the memory that has transmitted the data pieces in each packet, the bus mater ID of the bus master which is the transmission destination of each packet, and the permission/rejection information indicating whether or not the order of the packets is permitted to be changed on the transmission path.

The information to be stored on each of the change permission/rejection information storage 407, the IF information storage 411, and the sorter 413 may be stored as follows. A plurality of pieces of information are stored in advance, and which piece of information is to be used is determined based on the control signal from the bus master when the bus master 402 is started or when the application or the use case is changed.

Alternatively, the information to be stored on each of the change permission/rejection information storage 407, the IF information storage 411, and the sorter 413 may be changed directly by the bus master.

For example, the sorter 413 in the relay device 1601 may store the sorting rule based only on the memory IDs shown in FIG. 16A and the sorting rule based on both of the memory IDs and the bus master IDs shown in FIG. 23A. In the case where one bus master transmits data pieces in the local bus, the sorting rule shown in FIG. 16A may be used. In the case where a plurality of bus masters transmit data pieces as a result of a change of the use case, the sorting rule shown in FIG. 23A may be used. This allows the use efficiency of the buffer 409 to be improved in accordance with the use case.

In the above description regarding the relay device 1601 shown in FIG. 22, the connection controller 410 selects connection of the output port to the local bus for a packet that is to be transmitted from the system bus to the local bus. This is merely an example. The connection controller 410 may select connection of the output port to the system bus for a packet that is to be transmitted from the local bus to the system bus. Alternatively, the connection controller 410 may select connection of the output port to the local bus for a packet that is to be transmitted from both of the system bus and the local bus to another local bus. Still alternatively, the connection controller 410 may select connection of the output port to the system bus for a packet that is to be transmitted from both of the local bus and the system bus to another system bus.

In the structure shown in each of FIG. 14 and FIG. 21, the order of the response data pieces from the memories is changed at one position on the route. Alternatively, a plurality of elements on the bus on the semiconductor integrated circuit may change the order in a dispersed manner (independently). In FIG. 14 and FIG. 21, one memory 303 is connected to one NIC 1003 that is connected to the slave for the sake of simplicity. The number of the memories 303 connected to one NIC 1003 is not limited to one.

Figure 27:
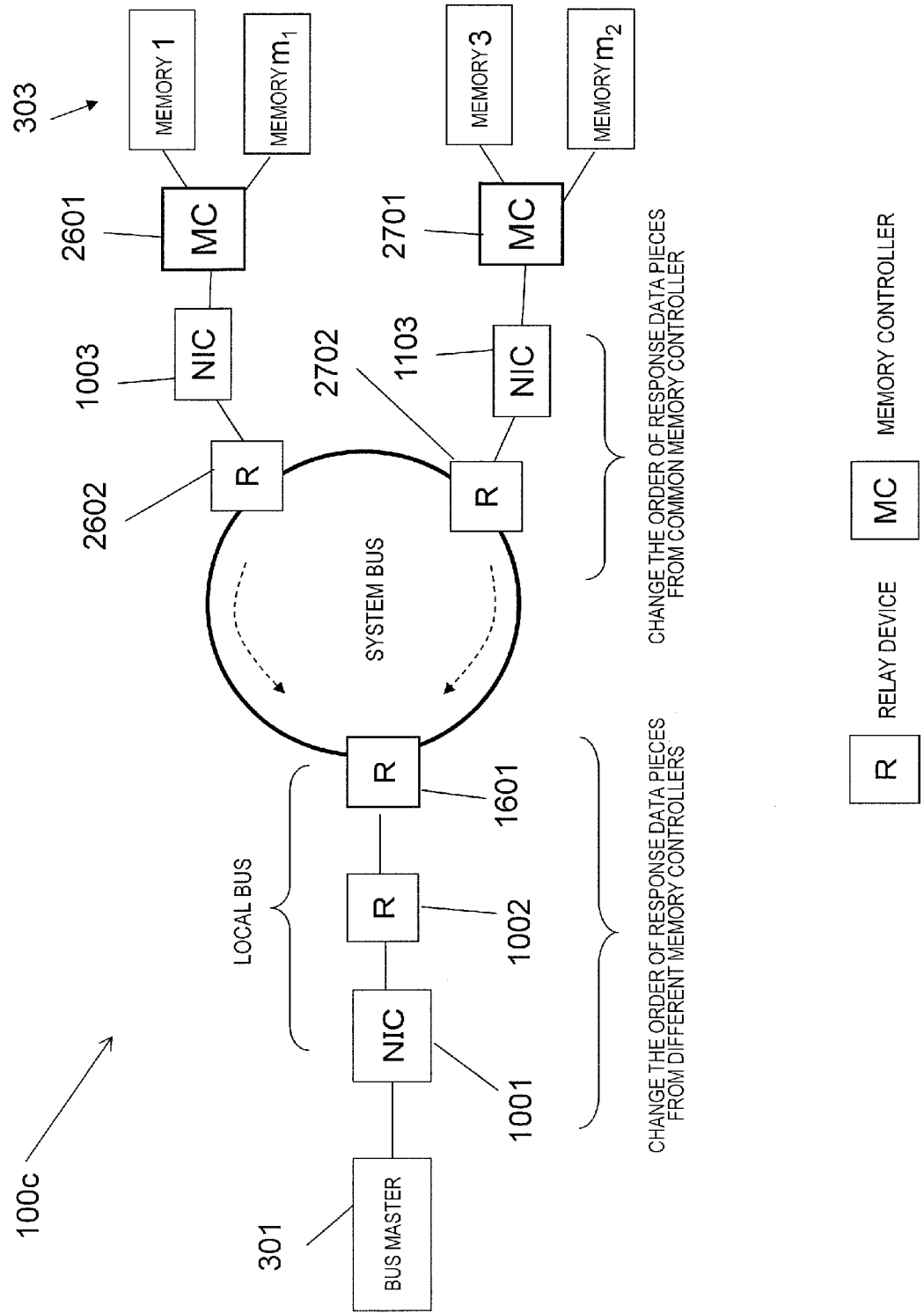
FIG. 27 shows a structure of a bus system 100c allowing the order of response data pieces from memories to be changed by a plurality of elements.

FIG. 27 shows a structure of a bus system 100c allowing the order of the response data pieces from the memories to be changed by a plurality of elements. Elements which are the same as those in FIG. 14 and FIG. 21 will bear the same reference signs therewith, and descriptions thereof will be omitted.

In the bus system 100c shown in FIG. 27, a plurality of memories 303 are connected to the NIC 1003 that is connected to a slave. The NIC 1003 shown in FIG. 27 transmits data pieces to, and receives data pieces from, the plurality of memories 303 via a memory controller 2601. The memory controller 2601 is a circuit that controls, for example, data read from, or data write to, the memories 303. In FIG. 14 and FIG. 21, the memory controller 2601 is omitted.

With reference to FIG. 27, a case where the order of the response data pieces is not changed on a forward path of the system bus will be discussed. In this case, a bus control device in the NIC 1003 or a relay device 2602 connected to the NIC 1003 can change, in advance, the order of the response data pieces from the plurality of memories 303 controlled by the common memory controller 2601. The term "in advance" refers to "prior to the change on the local bus shown in FIG. 27". Namely, in this embodiment, either the bus control device in the NIC 1003 or the relay device 2602 connected to the NIC 1003 and the system bus changes the order of the response data pieces from the plurality of memories controlled by the common memory controller 2601 and transmits the response data pieces to the system bus. When response data pieces from a plurality of memories controlled by different memory controllers reach the local bus from the system bus, either one of the NIC 1001 connected to the bus master, the relay device 1002 on the local bus, and the relay device 1601 that connects the system bus and the local bus to each other may change the order of the response data pieces.

In this manner, the process of changing the order of the response data pieces from the plurality of memories 303 is executed by a plurality of elements on the transmission path in a dispersed manner, so that the load of parallel processes on the response data pieces performed by each of the NICs and relay devices can be reduced, and the storage capacity required for storing the order of the data pieces can be decreased.

All the NICs, relay devices and the like may each have a structure of changing the order of the response data pieces. Alternatively, only the NICs, relay devices and the like that change the order of the response data pieces may each have such a structure, whereas none of the NICs, the relay devices and the like that do not change the order of the response data pieces may have such a structure. In the case where all the NICs, relay devices and the like each have such a structure, the NICs, the relay devices and the like that change the order of the response data pieces can be dynamically changed. Even in the case where all NICs, relay devices and the like each have such a structure, only specified NICs, relay devices and the like determined at the time of, for example, designing, mounting or the like may change the order of the response data pieces.

The above examples are described with an assumption that the bus control device is provided in the NIC 1003 or the NIC 1001. This is merely an example. As shown in FIG. 3, the bus control devices and the NICs may be separate from each other.

The above-described bus control device may be incorporated into the memory controller 2601, so that the memory controller 2601 can be provided with a function of changing the order of the response data pieces from the plurality of memories 303 controlled by the memory controller 2601 itself. In this case, the order of the response data pieces from a group of memories controlled by different memory controllers such as the memory controller 2601 and a memory controller 2701 (i.e., a memory group of memories 1 and m, and a memory group of memories 3 and m2) may be changed by either one of the NIC 1001, the relay device 1002 and the relay device 1601 on the local bus. In this case, it should be noted that the order of request data pieces transmitted to the memory group of memories 1 and m1 and to the memory group of memories 3 and m2 needs to be maintained by either one of the NIC 1001, the relay device 1002 and the relay device 1601.

In this embodiment, the structures and operations of the memory controller 2701, an NIC 1103 and a relay device 2702 shown in FIG. 27 are respectively the same as those of the memory controller 2601, the NIC 1003 and the relay device 2602.

Figure 28:
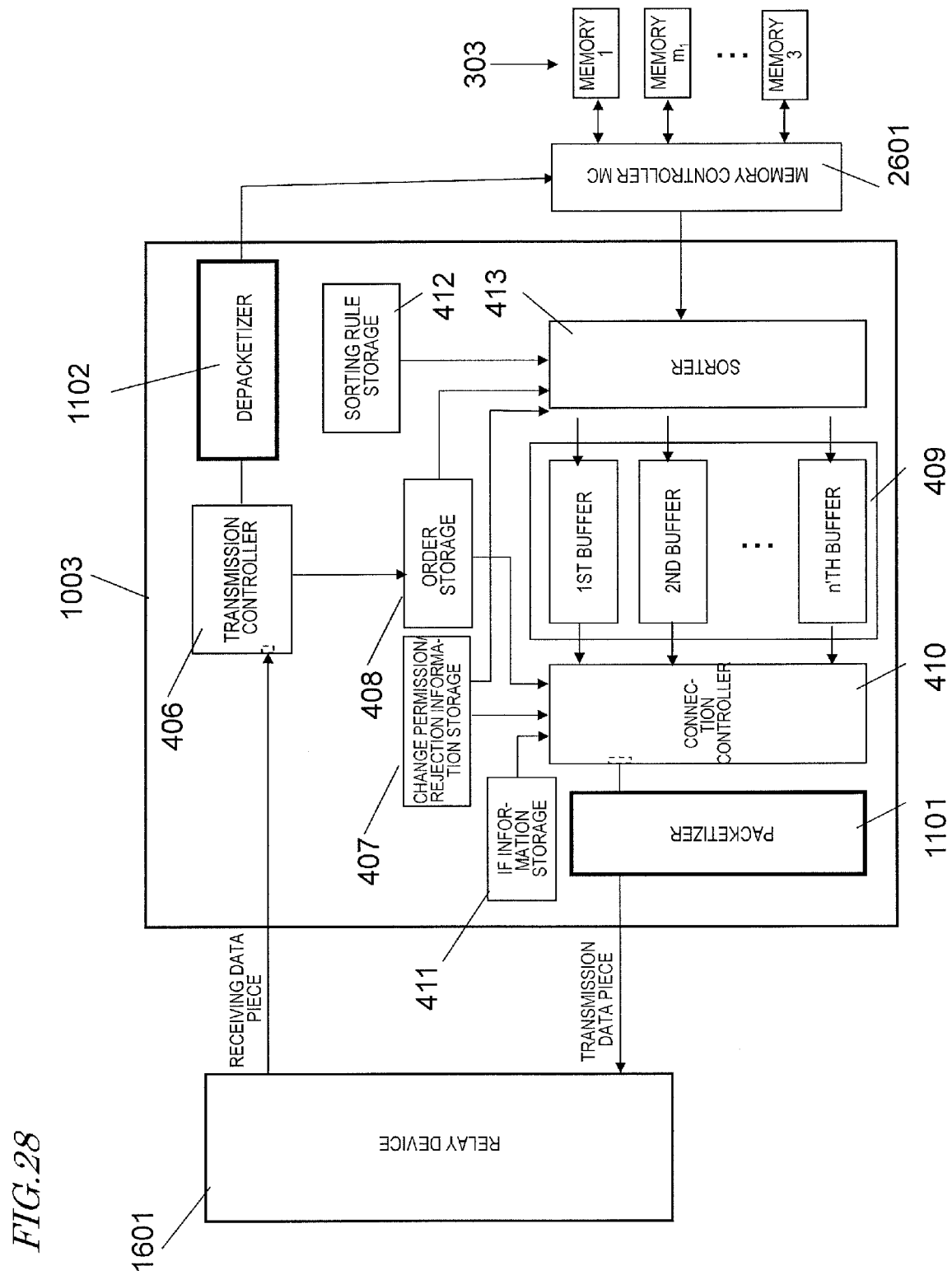
FIG. 28 shows a structure of an NIC 1003 connected to a memory controller 2601.

FIG. 28 shows a structure of the NIC 1003 connected to the memory controller 2601. Elements which are the same as those shown in FIG. 15 will bear the same reference signs therewith, and descriptions thereof will be omitted. A system bus, although existing between the NIC 1003 and the relay device 1601, is not explicitly shown in the figure.

The NIC 1003 is provided between, and connects to each other, the relay device 1601 and the memory controller 2601. The NIC 1003 and the NIC 401b (FIG. 15) are different from each other in that the packetizer 1101 and the depacketizer 1102 are positionally exchanged with each other.

The depacketizer 1102 in the NIC 1003 converts data pieces included in a request packet received from the relay device 1601 into a communication protocol usable between the memory controller 2601 and the NIC 1003, and transmits the communication protocol to the memory controller 2601. The packetizer 1101 in the NIC 1003 converts response data pieces received from the memory controller 2601 into a packet, and transmits the packet to the relay device 2602. The process of changing the order of the response data pieces is performed in substantially the same manner as by the bus NIC 401b shown in FIG. 15.

This disclosure is usable for an interface device or the like provided between a bus and a memory on an on-chip bus or a local bus on a general-purpose processor or a DSP.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A bus system including a packet-exchange-system bus configured on an integrated circuit, the bus system comprising:
    a first node;
    a plurality of second nodes;
    a plurality of relay devices including a first relay device and a second relay device;
    a first bus control device provided on a transmission path for data pieces to be transmitted and received between the first node and the first relay device; and
    a second bus control device provided on a transmission path for data pieces to be transmitted and received between the plurality of second nodes and the second relay device;
    wherein at least one of the plurality relay devices, the first bus control device, and the second bus control device includes:
        a relay buffer that stores data pieces received from the bus;

a relay controller that transmits the data pieces stored on the relay buffer to either one of the plurality of second nodes;

an order storage that stores a transmission order of the data pieces transmitted to each of the second nodes;

a sorter that receives data pieces transferred from each of the second nodes toward the first node and refers to a predefined sorting rule to determine a sorting destination of each of the data pieces;

a buffer that stores the sorted data pieces in the state where the sorted data pieces are classified by the second node as a transmission source of each of the data pieces;

a connection controller that refers to change permission/rejection information indicating whether or not an order of the data pieces is permitted to be changed while the data pieces are transferred from each of the second nodes to the first node, and performs control such that data pieces, the order of which is not permitted to be changed, are transmitted from the buffer to the first node in the same order as the transmission order stored on the order storage; and a transmission controller controlled by the connection controller to output the data pieces to the bus, wherein:

the plurality of relay devices further comprise an inter-bus relay device that connects a local bus and a system bus to each other;

the local bus includes the first control device and the first relay device;

the system bus includes the second relay device;

the connection controller included in the at least one of the devices performs control such that the data pieces are transmitted from the buffer to the first node in the same order as the transmission order stored on the order storage.

2. The bus system according to claim 1, further comprising:

a third relay device;

a plurality of third nodes; and a third bus control device provided on a transmission path for data pieces to be transmitted and received between the plurality of third nodes and the third relay device;

in the at least one of the devices, the relay control device transmits the data pieces stored on the relay buffer also to either one of the plurality of third nodes;

the order storage also stores a transmission order of the data pieces transmitted to each of the third nodes;

the sorter receives data pieces transferred from each of the second nodes and each of the third nodes toward the first node and refers to a predefined sorting rule to determine the sorting destination of each of the data pieces;

the buffer stores the sorted data pieces in the state where the sorted data pieces are classified by the second node and the third node as transmission sources of the data pieces; and the connection controller refers to change permission/rejection information indicating whether or not an order of the data pieces is permitted to be changed while the data pieces are transferred from each of the second nodes and each of the third nodes to the first node, and performs control such that data pieces, the order of which is not permitted to be changed, are transmitted from the buffer to the first node in the same order as the transmission order stored on the order storage.

3. The bus system according to claim 2, wherein:

the third bus control device includes:

a relay buffer that stores data pieces received from the bus;

a relay control device that transmits the data pieces stored on the relay buffer to either one of the plurality of third nodes;

an order storage that stores a transmission order of the data pieces transmitted to each of the third nodes;

a sorter that receives data pieces transferred from each of the third nodes toward the first node and refers to a predefined sorting rule to determine the sorting destination of each of the data pieces;

a buffer that stores the sorted data pieces in the state where the sorted data pieces are classified by the third node as a transmission source of each of the data pieces;

a connection controller refers to change permission/rejection information indicating whether or not an order of the data pieces is permitted to be changed while the data pieces are transferred from each of the third nodes to the first node, and performs control such that data pieces, the order of which is not permitted to be changed, are transmitted from the buffer to the first node in the same order as the transmission order stored on the order storage; and a transmission controller controlled by the connection controller to output the data pieces to the bus; and in the third bus control device, the connection controller performs control such that the data pieces are transmitted from the buffer to the first node in the same order as the transmission order stored on the order storage.

* * * * *